US010529186B2

(12) United States Patent
Baerlocher et al.

(10) Patent No.: US 10,529,186 B2
(45) Date of Patent: *Jan. 7, 2020

(54) GAMING SYSTEM, GAMING DEVICE AND METHOD FOR DETERMINING AN OUTCOME OF A SECONDARY GAME BASED ON ONE OR MORE EVENTS WHICH OCCUR IN ASSOCIATION WITH A PRIMARY GAME

(71) Applicant: IGT, Las Vegas, NV (US)

(72) Inventors: Anthony J. Baerlocher, Henderson, NV (US); Alexandria Estella Ponte Sutich, Reno, NV (US); Lance R. Peterson, Reno, NV (US)

(73) Assignee: IGT, Las Vegas, NV (US)

( * ) Notice: Subject to any disclaimer, the term of this patent is extended or adjusted under 35 U.S.C. 154(b) by 298 days.

This patent is subject to a terminal disclaimer.

(21) Appl. No.: 15/404,956

(22) Filed: Jan. 12, 2017

(65) Prior Publication Data

US 2017/0124803 A1 May 4, 2017

Related U.S. Application Data

(63) Continuation of application No. 14/824,932, filed on Aug. 12, 2015, now Pat. No. 9,547,955, which is a (Continued)

(51) Int. Cl.

*A63F 13/00* (2014.01)
*G07F 17/32* (2006.01)
*G07F 17/34* (2006.01)

(52) U.S. Cl.

CPC ...... *G07F 17/3248* (2013.01); *G07F 17/3209* (2013.01); *G07F 17/3211* (2013.01);
(Continued)

(58) Field of Classification Search

None
See application file for complete search history.

(56) References Cited

U.S. PATENT DOCUMENTS 5,655,961 A 8/1997 Acres et al.
5,702,304 A 12/1997 Acres et al.
(Continued)

FOREIGN PATENT DOCUMENTS

WO WO2006096795 9/2006
WO WO2007006002 1/2007
(Continued)

OTHER PUBLICATIONS

Sport of Kings Advertisement, written by Multimedia Games, Inc., published in 2008.
(Continued)

*Primary Examiner* — Sunit Pandya
(74) *Attorney, Agent, or Firm* — Neal, Gerber & Eisenberg LLP

(57) ABSTRACT

In various embodiments, the gaming system, gaming device, and gaming method disclosed herein includes an accumulation sequence and a competition sequence. In one embodiment, the gaming system includes competitor points which determine (i) a competitor's eligibility to participate in the competition sequence and (ii) the competitor's relative probability of success in the competition sequence. In this embodiment, a competitor (which is either representative of an actual player or a virtual, gaming system controlled player) accumulates competitor points during one or more point accumulation sequences which occur in association with designated events. For a subsequent competition sequence, the gaming system determines if a competitor will participate in the triggered competition sequence based on the competitor's accumulated competitor points. For the subsequent competition sequence, the gaming system further determines the competitor's relative probability of success in the competition sequence based on the competitor's accumulated competitor points.

21 Claims, 13 Drawing Sheets

| Relative Probability to Win the Competition Sequence | | | |
|---|---|---|---|
| Player | Competitor | Quantity of Competitor Points | Relative Probability to Win |
| 1 | A | 50 | 25.0% |
| 2 | B | 20 | 10.0% |
| 3 | C | 75 | 37.5% |
| 4 | D | 30 | 15.0% |
| 5 | E | 25 | 12.5% |

Related U.S. Application Data continuation of application No. 14/449,615, filed on Aug. 1, 2014, now Pat. No. 9,129,482, which is a continuation of application No. 13/720,078, filed on Dec. 19, 2012, now Pat. No. 8,827,800, which is a continuation of application No. 12/618,427, filed on Nov. 13, 2009, now Pat. No. 8,342,947.

(52) U.S. Cl.
CPC ...... *G07F 17/3225* (2013.01); *G07F 17/3244* (2013.01); *G07F 17/3255* (2013.01); *G07F 17/3258* (2013.01); *G07F 17/3267* (2013.01); *G07F 17/3272* (2013.01); *G07F 17/3276* (2013.01); *G07F 17/3288* (2013.01); *G07F 17/34* (2013.01)

(56) References Cited

U.S. PATENT DOCUMENTS 5,741,183 A 4/1998 Acres et al.
5,743,800 A 4/1998 Huard et al.
5,752,882 A 5/1998 Acres et al.
5,779,549 A 7/1998 Walker et al.
5,820,459 A 10/1998 Acres et al.
5,823,879 A 10/1998 Goldberg et al.
5,830,067 A 11/1998 Graves et al.
5,833,537 A 11/1998 Barrie
5,836,817 A 11/1998 Acres et al.
5,876,284 A 3/1999 Acres et al.
5,997,400 A 12/1999 Seelig et al.
6,024,643 A 2/2000 Begis
6,159,097 A 12/2000 Gura
6,162,122 A 12/2000 Acres et al.
6,183,366 B1 2/2001 Goldberg et al.
6,210,275 B1 4/2001 Olsen
6,217,448 B1 4/2001 Olsen
6,224,486 B1 5/2001 Walker et al.
6,231,445 B1 5/2001 Acres
6,244,957 B1 6/2001 Walker et al.
6,244,958 B1 6/2001 Acres
6,254,483 B1 7/2001 Acres
6,264,560 B1 7/2001 Goldberg et al.
6,273,820 B1 8/2001 Haste, III
6,306,038 B1 10/2001 Graves et al.
6,309,300 B1 * 10/2001 Glavich .................. G07F 17/32 463/16
6,312,333 B1 11/2001 Acres
6,319,125 B1 11/2001 Acres
6,322,451 B1 11/2001 Miura
6,328,649 B1 12/2001 Randall et al.
6,364,768 B1 4/2002 Acres et al.
6,371,852 B1 4/2002 Acres
6,375,567 B1 4/2002 Acres
6,375,568 B1 4/2002 Roffman et al.
6,375,569 B1 4/2002 Acres
6,406,369 B1 6/2002 Baerlocher et al.
6,425,824 B1 7/2002 Baerlocher et al.
6,425,828 B2 7/2002 Walker et al.
6,431,983 B2 8/2002 Acres
RE37,885 E 10/2002 Acres et al.
6,508,709 B1 1/2003 Karmarker
6,565,434 B1 5/2003 Acres
6,592,457 B1 7/2003 Frohm et al.
6,605,001 B1 8/2003 Tarantino
6,607,441 B1 8/2003 Acres
6,656,048 B2 12/2003 Olsen
6,712,697 B2 3/2004 Acres
6,712,702 B2 3/2004 Goldberg et al.
6,719,630 B1 4/2004 Seelig et al.
6,726,563 B1 4/2004 Baerlocher et al.
6,729,959 B1 5/2004 Moore et al.
6,763,273 B2 7/2004 Chudley et al.
6,780,111 B2 8/2004 Cannon et al.
6,796,900 B2 9/2004 Baerlocher et al.
6,800,030 B2 10/2004 Acres
6,832,958 B2 12/2004 Acres et al.
6,837,793 B2 1/2005 McClintic
6,902,478 B2 6/2005 McClintic
6,910,964 B2 6/2005 Acres
6,910,965 B2 6/2005 Downes
6,929,546 B2 8/2005 Moore et al.
6,929,550 B2 8/2005 Hisada
6,939,224 B2 9/2005 Palmer et al.
RE38,812 E 10/2005 Acres et al.
6,960,134 B2 11/2005 Hartl et al.
7,025,674 B2 4/2006 Adams et al.
7,052,392 B2 5/2006 Tessmer et al.
7,056,213 B2 6/2006 Ching et al.
7,070,505 B2 7/2006 Vancura et al.
7,074,127 B2 7/2006 Cuddy et al.
7,077,744 B2 7/2006 Cannon
7,081,050 B2 7/2006 Tarantino
7,094,148 B2 8/2006 Baerlocher et al.
7,094,151 B2 8/2006 Downes
7,121,942 B2 10/2006 Baerlocher
7,156,739 B2 1/2007 Walker et al.
7,156,741 B2 1/2007 Hornik et al.
7,172,508 B2 2/2007 Simon et al.
7,192,352 B2 3/2007 Walker et al.
7,201,657 B2 4/2007 Baerlocher et al.
7,255,644 B2 8/2007 Duhamel
7,291,067 B2 11/2007 Tarantino
7,311,604 B2 11/2007 Kaminkow et al.
7,311,598 B2 12/2007 Kaminkow et al.
7,314,408 B2 1/2008 Cannon
7,361,087 B2 4/2008 Baerlocher et al.
7,364,509 B2 4/2008 Slade
7,377,852 B2 5/2008 Nagashima
7,393,280 B2 7/2008 Cannon
7,427,234 B2 9/2008 Soltys et al.
7,427,236 B2 9/2008 Kaminkow et al.
7,429,215 B2 9/2008 Rozkin et al.
7,442,123 B2 10/2008 Brill et al.
7,481,708 B2 1/2009 Baerlocher et al.
7,500,913 B2 3/2009 Baerlocher
7,500,915 B2 3/2009 Wolf et al.
7,503,849 B2 3/2009 Hornik et al.
7,559,838 B2 7/2009 Walker et al.
7,568,973 B2 8/2009 Iddings et al.
7,585,223 B2 8/2009 Iddings et al.
7,597,621 B2 10/2009 Baerlocher
7,607,976 B2 10/2009 Baerlocher et al.
7,607,977 B2 10/2009 Baerlocher et al.
7,618,319 B2 11/2009 Casey et al.
7,621,809 B2 11/2009 Baerlocher et al.
7,785,194 B2 8/2010 Schneider et al.
7,862,430 B2 * 1/2011 Baerlocher ......... G07F 17/3255 463/20
2001/0046893 A1 11/2001 Giobbi et al.
2001/0055990 A1 12/2001 Acres
2002/0123376 A1 * 9/2002 Walker ................ G07F 17/3244 463/11
2002/0188361 A1 12/2002 Chudley et al.
2003/0083943 A1 * 5/2003 Adams .................. G06Q 30/02 705/14.23
2003/0109301 A1 6/2003 Chudley et al.
2003/0146574 A1 8/2003 Duhamel
2003/0199315 A1 10/2003 Downes
2004/0005926 A1 1/2004 LeFroy
2004/0137982 A1 7/2004 Cuddy et al.
2004/0224742 A1 11/2004 Chudley et al.
2005/0032573 A1 2/2005 Acres et al.
2005/0101374 A1 5/2005 Acres
2005/0181869 A1 8/2005 Downes
2006/0025195 A1 2/2006 Pennington et al.
2006/0040732 A1 2/2006 Baerlocher et al.
2006/0040734 A1 2/2006 Baerlocher et al.
2006/0121971 A1 6/2006 Slomiany et al.
2006/0128460 A1 6/2006 Muir et al.
2006/0214376 A1 9/2006 Weller
2006/0246990 A1 11/2006 Downes
2007/0060314 A1 3/2007 Baerlocher et al.
2007/0060321 A1 3/2007 Vasquez et al.

(56) References Cited

U.S. PATENT DOCUMENTS

| | | | |
|---|---|---|---|
| 2007/0077990 | A1 | 4/2007 | Cuddy et al. |
| 2007/0082725 | A1 | 4/2007 | Low et al. |
| 2007/0087825 | A1 | 4/2007 | Hart et al. |
| 2007/0105619 | A1 | 5/2007 | Kniesteadt et al. |
| 2007/0105620 | A1 | 5/2007 | Cuddy et al. |
| 2007/0155485 | A1 | 7/2007 | Cuddy et al. |
| 2007/0167217 | A1 | 7/2007 | Kaminkow et al. |
| 2008/0020833 | A1 | 1/2008 | Baerlocher et al. |
| 2008/0020834 | A1 | 1/2008 | Breckner et al. |
| 2008/0020846 | A1 | 1/2008 | Vasquez et al. |
| 2008/0032764 | A1 | 2/2008 | Cannon |
| 2008/0076531 | A1 | 3/2008 | Baerlocher et al. |
| 2008/0076532 | A1 | 3/2008 | Graham et al. |
| 2008/0076542 | A1 | 3/2008 | Iddings et al. |
| 2008/0081690 | A1 | 4/2008 | Baerlocher et al. |
| 2008/0090651 | A1 | 4/2008 | Baerlocher |
| 2008/0102916 | A1 | 5/2008 | Kovacs et al. |
| 2008/0102920 | A1 | 5/2008 | Baerlocher |
| 2008/0108401 | A1 | 5/2008 | Baerlocher et al. |
| 2008/0108429 | A1 | 5/2008 | Davis et al. |
| 2008/0113714 | A1 | 5/2008 | Vallejo |
| 2008/0113765 | A1 | 5/2008 | DeWaal |
| 2008/0113771 | A1 | 5/2008 | Baerlocher et al. |
| 2008/0113780 | A1 | 5/2008 | Vallejo |
| 2008/0220846 | A1 | 9/2008 | Okada |
| 2008/0220881 | A1 | 9/2008 | Okada |
| 2008/0254876 | A1 | 10/2008 | Koustas |
| 2008/0274790 | A1 | 11/2008 | Cannon |
| 2008/0311980 | A1 | 12/2008 | Cannon |
| 2009/0011824 | A1 | 1/2009 | Englman et al. |
| 2009/0017899 | A1 | 1/2009 | Fujimoto et al. |
| 2009/0036202 | A1 | 2/2009 | Baerlocher et al. |
| 2009/0042644 | A1 | 2/2009 | Zielinski |
| 2009/0054122 | A1 | 2/2009 | Saito |
| 2009/0069065 | A1* | 3/2009 | Vallejo ................ G07F 17/3258 463/20 |
| 2009/0075734 | A1 | 3/2009 | Saito |
| 2009/0088253 | A1 | 4/2009 | Oberberger et al. |
| 2009/0104987 | A1 | 4/2009 | Kelly et al. |
| 2009/0111560 | A1 | 4/2009 | Davis et al. |
| 2009/0111573 | A1 | 4/2009 | Iddings |
| 2009/0117970 | A1 | 5/2009 | DeWaal et al. |
| 2009/0117979 | A1 | 5/2009 | Decasa, Jr. et al. |
| 2009/0124320 | A1 | 5/2009 | DeWaal |
| 2009/0124327 | A1 | 5/2009 | Caputo et al. |
| 2009/0124362 | A1 | 5/2009 | Cuddy et al. |
| 2009/0124363 | A1 | 5/2009 | Baerlocher et al. |
| 2009/0124385 | A1 | 5/2009 | Cuddy et al. |
| 2009/0253492 | A1 | 10/2009 | Caputo et al. |
| 2009/0305765 | A1 | 12/2009 | Walker et al. |
| 2009/0318220 | A1 | 12/2009 | Arezina et al. |
| 2009/0327060 | A1 | 12/2009 | Arezina et al. |
| 2010/0016065 | A1 | 1/2010 | Nicely et al. |
| 2011/0117981 | A1* | 5/2011 | Baerlocher ......... G07F 17/3244 463/16 |
| 2011/0143834 | A1 | 6/2011 | Guinn et al. |
| 2011/0201414 | A1* | 8/2011 | Barclay ............... G07F 17/3206 463/25 |

FOREIGN PATENT DOCUMENTS

| | | |
|---|---|---|
| WO | WO2007092595 | 8/2007 |
| WO | WO2008021448 | 2/2008 |

OTHER PUBLICATIONS

Beat the Field Advertisement. written by Konami, published prior to Nov. 13, 2009.

* cited by examiner

FIG. 4

| Relative Probability to Win the Competition Sequence | | | |
|---|---|---|---|
| Player | Competitor | Quantity of Competitor Points | Relative Probability to Win |
| 1 | A | 50 | 25.0% |
| 2 | B | 20 | 10.0% |
| 3 | C | 75 | 37.5% |
| 4 | D | 30 | 15.0% |
| 5 | E | 25 | 12.5% |

FIG. 6

| Competition Sequence Eligibility | | |
| --- | --- | --- |
| Level | Required Quantity of Eligibility Points | Award Provided for a Win |
| A | ≥ 1 | $10.00 |
| B | ≥ 2 | $100.00 |
| C | ≥ 11 | $200.00 |

FIG. 11

| Relative Probability to Win the Competition Sequence | | | | |
|---|---|---|---|---|
| Player | Competitor | Quantity of Competitor Points | Relative Probability to Win | Award Provided for a Win |
| 1 | A | 50 | 25.0% | N/A |
| 2 | B | 20 | 10.0% | 100 credits |
| 3 | C | 75 | 37.5% | 100 credits |
| 4 | D | 30 | 15.0% | 100 credits |
| 5 | E | 25 | 12.5% | 100 credits |

FIG. 12

| Relative Probability to Win the Competition Sequence | | | | |
|---|---|---|---|---|
| Player | Competitor | Quantity of Competitor Points | Relative Probability to Win | Award Provided for a Win |
| 1 | A | 50 | 20.83% | 100 credits |
| 2 | B | 20 | 8.33% | 100 credits |
| 3 | C | 75 | 31.25% | 100 credits |
| 4 | D | 30 | 12.50% | 100 credits |
| 5 | E | 25 | 10.42% | 100 credits |
| N/A | F | 40 | 16.67% | N/A |

GAMING SYSTEM, GAMING DEVICE AND METHOD FOR DETERMINING AN OUTCOME OF A SECONDARY GAME BASED ON ONE OR MORE EVENTS WHICH OCCUR IN ASSOCIATION WITH A PRIMARY GAME

PRIORITY CLAIM

This application is a continuation of, claims priority to and the benefit of U.S. patent application Ser. No. 14/824,932, filed on Aug. 12, 2015, which is a continuation of, claims priority to and the benefit of U.S. patent application Ser. No. 14/449,615, filed on Aug. 1, 2014, now U.S. Pat. No. 9,129,482, which is a continuation of, claims priority to and the benefit of U.S. patent application Ser. No. 13/720,078, filed on Dec. 19, 2012, now U.S. Pat. No. 8,827,800, which is a continuation of, claims priority to and the benefit of U.S. patent application Ser. No. 12/618,427, filed on Nov. 13, 2009, now U.S. Pat. No. 8,342,947, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming devices which provide players awards in primary or base games are well known. Gaming devices generally require the player to place or make a wager to activate the primary or base game. In many of these gaming devices, the award is based on the player obtaining a winning symbol or symbol combination and on the amount of the wager (e.g., the higher the wager, the higher the award). Symbols or symbol combinations which are less likely to occur usually provide higher awards.

In such known gaming devices, the amount of the wager made on the primary game by the player may vary. For instance, the gaming device may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming device, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

Secondary or bonus games are also known in gaming devices. The secondary or bonus games usually provide an additional award to the player. Secondary or bonus games usually do not require an additional wager by the player to be activated. Certain secondary or bonus games are activated or hit upon an occurrence of a designated triggering symbol or triggering symbol combination in the primary or base game. For instance, a bonus symbol occurring on the payline on the third reel of a three reel slot machine may hit the secondary bonus game. Part of the enjoyment and excitement of playing certain gaming devices is the occurrence or triggering of the secondary or bonus game (even before the player knows how much the bonus award will be).

There is also a continuing need to provide new and different gaming devices and gaming systems as well as new and different ways to provide awards to players including bonus awards.

SUMMARY

In various embodiments, the gaming system, gaming device, and gaming method disclosed herein includes an accumulation sequence and a competition sequence. In one embodiment, the gaming system includes competitor points which determine (i) a competitor's eligibility to participate in the competition sequence and/or (ii) the competitor's relative probability of success in the competition sequence. In this embodiment, a competitor (which is either representative of an actual player or a virtual, gaming system controlled player) accumulates competitor points during one or more point accumulation sequences which occur in association with designated events, such as plays of a primary game. For a subsequent competition sequence, the gaming system determines if a competitor will participate in the triggered competition sequence based on the competitor's accumulated competitor points. For the subsequent competition sequence, the gaming system further determines the competitor's relative probability of success in the competition sequence (and thus the relative probability of the player represented by the competitor winning an award) based on that competitor's accumulated competitor points.

In various embodiments, the gaming system accumulates competitor points for the competitor based on a plurality of different types of events which occur in association with one or more plays of the primary game, such as a placement of a wager and/or a generation of an outcome. If a competition sequence triggering event occurs, the gaming system triggers a competition sequence and enables a plurality of eligible competitors to participate in the triggered competition sequence. In one embodiment, the gaming system determines at least one competitor's eligibility to participate in the triggered competition sequence based on that competitor's quantity of accumulated competitor points. Thus, in certain embodiments, a competitor's eligibility to participate in a triggered competition sequence is based on one or more events which occur in association with one or more plays of a primary game.

In certain embodiments, the gaming system additionally determines the competitor's relative probability of winning the competition sequence (and thus the relative probability of the player represented by the competitor winning an award) based on the competitor's quantity of accumulated competitor points. That is, the gaming system determines a competitor's eligibility to participate in a competition sequence and the competitor's probability of winning the competition sequence based on the quantity of competitor points accumulated for the competitor. Thus, in these embodiments, the competitor's relative probability of winning the competition sequence is determined based, at least in part, on a plurality of different types of events which independently occur in association with one or more plays of the primary game.

In operation of one embodiment, the gaming system enables a player to place a wager on a play of a primary game. The gaming system then determines if the player (or gaming device the player is currently wagering at) is associated with a competitor. In certain instances, a number of players eligible to participate in a competition sequence is less than a minimum number of players required to participate in the competition sequence. Accordingly, the gaming system may employ one or more virtual, gaming system controlled players to participate in such competition sequences. For the accumulation sequence and the competition sequence, these virtual players and actual players are each represented as a competitor. Accordingly, a competitor, as described herein, is either associated with an actual player or is established by the gaming system to provide the necessary number of participants in a competition sequence.

If the player (or the gaming device) is not associated with a competitor, the gaming system assigns or otherwise associates one of a plurality of different competitors with the player (or the gaming device). After associating the competitor with the player, or if the gaming system determines that the player is already associated with a competitor, the gaming system enables the player to play the primary game.

In various embodiments, the gaming system accumulates competitor points for the competitor based on a plurality of different types of events which occur in association with the play of the primary game. For example, the gaming system accumulates a quantity of competitor points for the competitor based on a first type of event, such as a generation of a designated symbol combination and a second, different type of event, such as a triggered bonus game. Thus, the competitor's eligibility to participate in the competition sequence and the competitor's relative probability of winning the competition sequence are each based, at least in part, on a plurality of different types of events which occur in association with the play of the primary game.

If a competition sequence triggering event occurs, the gaming system triggers a competition sequence and determines a designated quantity of competitors to participate in the triggered competition sequence. In various embodiments, the gaming system determines which competitors (and thus which players) will participate in the competition sequence based on each competitor's determined eligibility. In one embodiment, a competitor's eligibility is determined based on a quantity of competitor points accumulated for the competitor. In one embodiment, different competition sequences are associated with different payouts and require competitors to accumulate different quantities of competitor points. For example, competition sequences which are associated with larger payouts require competitors to accumulate larger quantities of competitor points relative to competition sequences which are associated with smaller payouts.

After determining the designated quantity of competitors to participate in the competition sequence, the gaming system determines and displays each participating competitor's relative probability of winning the competition sequence. In one embodiment, after displaying each participating competitor's relative probability of winning the competition sequence, the gaming system enables each participating competitor to accumulate additional competitor points until a conclusion of a pre-competition sequence point accumulation period (i.e., a period of time between the determination of which competitors will participate in the competition sequence and an initiation of the competition sequence). By enabling the participating competitors to accumulate additional competitor points during the pre-competition sequence point accumulation period, the gaming system provides the participating competitors with one or more opportunities to increase their relative probability of winning the competition sequence.

If a participating competitor's relative probability of winning the competition sequence changes during the pre-competition point accumulation period (as a result of an increase or a decrease in the quantity of competitor points accumulated for the participating competitor relative to the quantity of competitor points accumulated for each competitor participating in the competition sequence), the gaming system displays the change. In one embodiment, in which the gaming system displays each participating competitor's relative probability of winning the competition sequence, the gaming system enables players at a gaming establishment to place wagers on one or more of the competitors participating in the triggered competition sequence. In this embodiment, if a player wagers on a competitor and that competitor subsequently wins the competition sequence (as discussed below), the gaming system provides the player an award based on the player's placed wager and the competitor's relative probability of winning the triggered competition sequence.

Upon a conclusion of the pre-competition sequence point accumulation period, the gaming system initiates the competition sequence and determines, for each participating competitor, an outcome of the competition sequence (and thus whether to provide an award to the player associated with the participating competitor) based, at least in part, on each participating competitor's relative probability of winning the competition sequence. It should be appreciated that although different competitor's are associated with different relative probabilities of winning the triggered competition sequence, the outcome of the competition sequence is determined based, at least in part, on one or more random determinations, and thus any participating competitor can potentially win the competition sequence. After providing any awards based on the outcome of the competition sequence, the gaming system resets each participating competitor's accumulated quantity of competitor points to a reset value.

In various alternative embodiments, the gaming system employs a dual point structure including both eligibility points and competitor points. That is, in these embodiments, rather than determine a competitor's eligibility to participate in a competition sequence based on the quantity of competitor points accumulated for the competitor, the gaming system determines the competitor's eligibility to participate in a competition sequence based on a quantity of eligibility points accumulated for the competitor (which are accumulated by the gaming system distinctly from competitor points). Accordingly, in addition to accumulating competitor points for a competitor, the gaming system additionally accumulates eligibility points for the competitor. For example, the gaming system accumulates one or more eligibility points for the competitor based on one or more wager related events which occur in association with a gaming device at a gaming establishment. In one embodiment, the gaming system additionally or alternatively accumulates eligibility points for a competitor based on one or more non-wager related events which occur remote from any wagering portion of a gaming establishment, such as a casino floor. Accordingly, if a competition sequence triggering event occurs, the gaming system determines at least one competitor's eligibility to participate in the triggered competition sequence based on that competitor's quantity of accumulated eligibility points.

In one embodiment, while each competitor's quantity of accumulated competitor points are reset to a reset value after each competition sequence the competitor participates in, the gaming system maintains the quantity of eligibility points accumulated for each competitor (i.e., the gaming system does not reset each competitor's accumulated quantity of eligibility points). In other words, although a competitor's probability of winning the competition sequence is based on competitor points which have been accumulated since a competition sequence the competitor previously participated in, the competitor's eligibility to participate in the triggered competition sequence is based on a quantity of eligibility points which have been accumulated since the competitor was associated with the player (and thus which persist for subsequent plays of the game).

In various embodiments, the gaming system enables eligible competitors to participate in triggered competition sequences regardless of whether the players associated with those competitors are placing wagers at gaming devices at a gaming establishment. In one such embodiment, the gaming system enables a player to make an input remote from any gaming establishment to associate an eligible competitor with a triggered competition sequence. In this embodiment, the gaming system randomly determines a quantity of competitor points for the competitor (and thus associates the competitor with a randomly determined relative probability of winning the competition sequence) regardless of an amount of competitor points previously accumulated for the competitor. In this embodiment, the competitor's relative probability of winning the competition sequence is thus determined independent of any events associated with any previously played games. While the gaming system does not provide any award having any monetary value to the player remote from the gaming establishment, in one embodiment, the gaming system accumulates a quantity of eligibility points for the competitor associated with the player remote from the gaming establishment. In this embodiment, the quantity of eligibility points accumulated for the competitor is determined based on the determined outcome of the competition sequence. In various embodiments, if a player associates a competitor with a triggered competition sequence from a location that is remote from any gaming establishment, the gaming system enables players at a gaming establishment to place wagers on that competitor for that competition sequence. In this embodiment, if the competitor wins the competition sequence, the gaming system provides awards to the players at the gaming establishment that placed wagers on that competitor.

By enabling players to place one or more wagers on a plurality of different competitors that are participating in a competition sequence, the gaming system provides players additional opportunities to win awards. Additionally, by accumulating one or more eligibility points for a competitor based on one or more inputs made by a player that is remote from any gaming establishment, the gaming system provides that a competitor's eligibility to participate in a triggered competition sequence is determined based, at least in part, on one or more non-wager related events. Accordingly, what a player does remote from a gaming establishment determines, at least in part, what competition sequences a competitor associated with that player is eligible to participate in (and thus which awards the player is eligible to win).

Additional features and advantages are described herein, and will be apparent from the following Detailed Description and the figures.

BRIEF DESCRIPTION OF THE FIGURES

FIG. 4 is a table illustrating the relative probabilities of a plurality of different competitors winning a triggered competition sequence based on different quantities of competitor points.

FIG. 6 is a table illustrating a plurality of different level competition sequences having a plurality of different awards and a plurality of different required quantities of eligibility points.

FIG. 11 is a table illustrating the relative probabilities of a plurality of different competitors winning a triggered competition sequence and the corresponding awards which are provided, one of the competitors associated with a player that is at a location which is remote from any gaming establishment.

FIG. 12 is a table illustrating the relative probabilities of a plurality of different competitors winning a triggered competition sequence and the corresponding awards which are provided, one of the competitors not being associated with any player.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
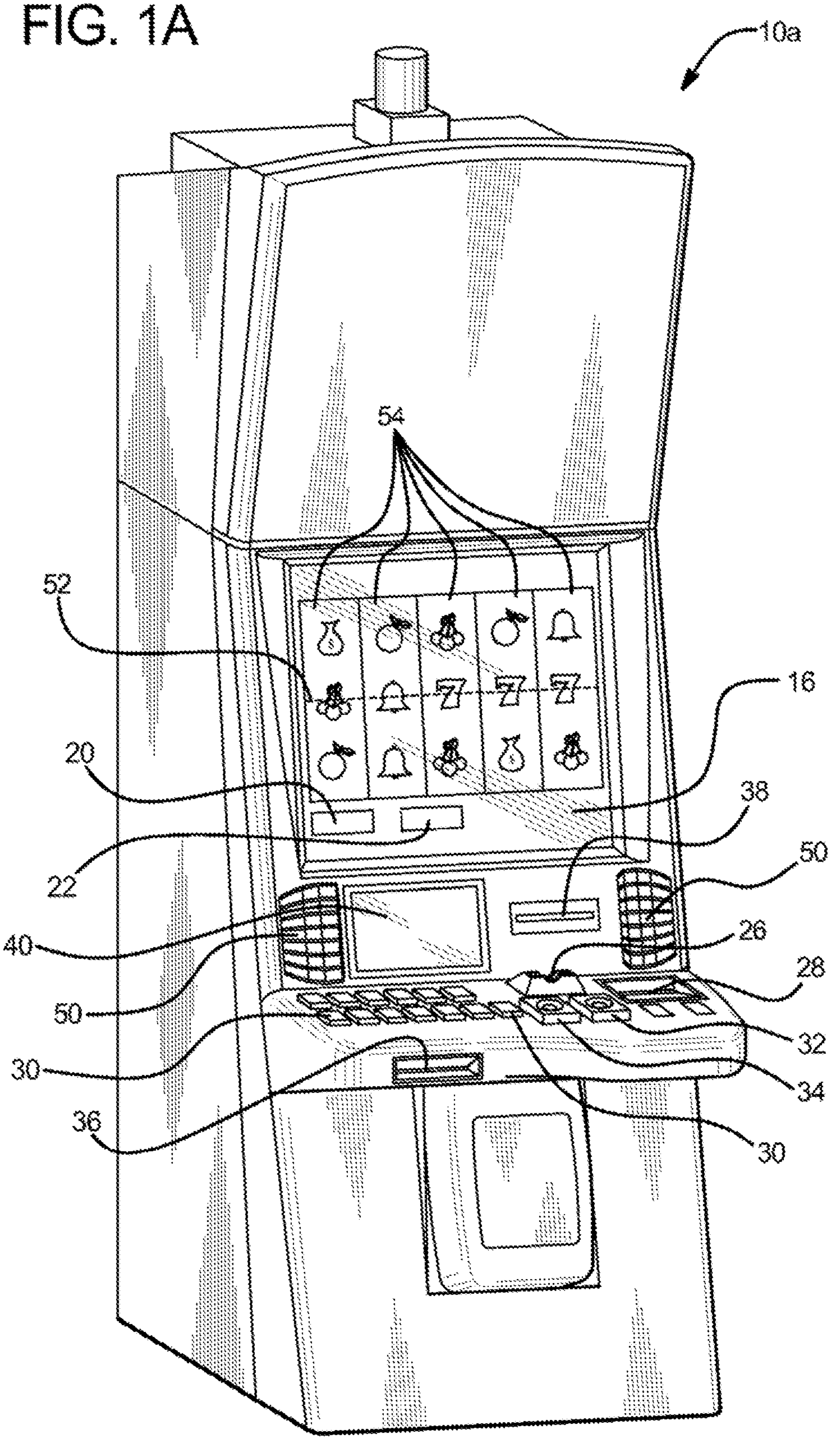
FIGS. 1A and 1B are front perspective views of alternative embodiments of gaming devices disclosed herein.
Figure 1B:
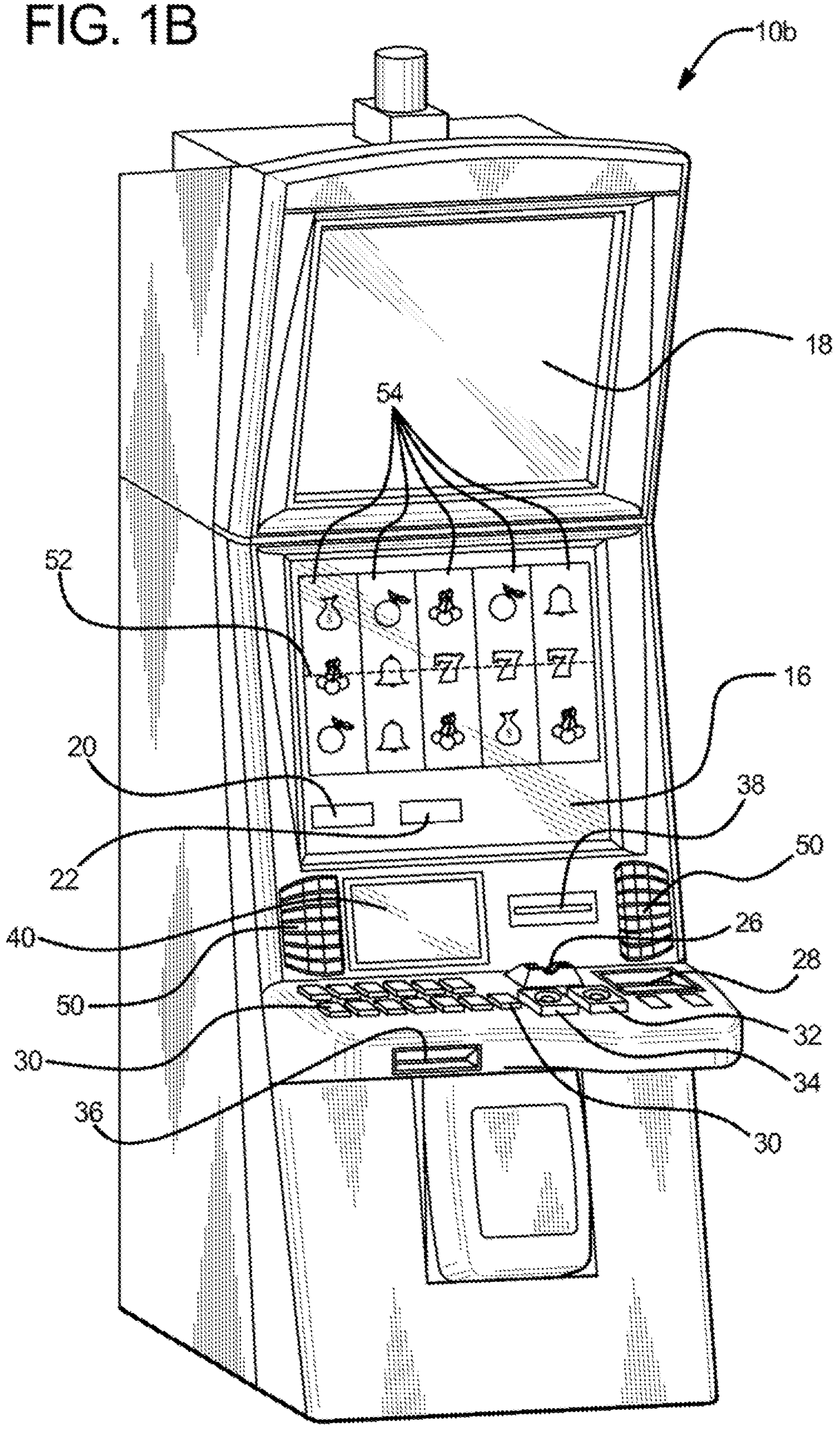

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
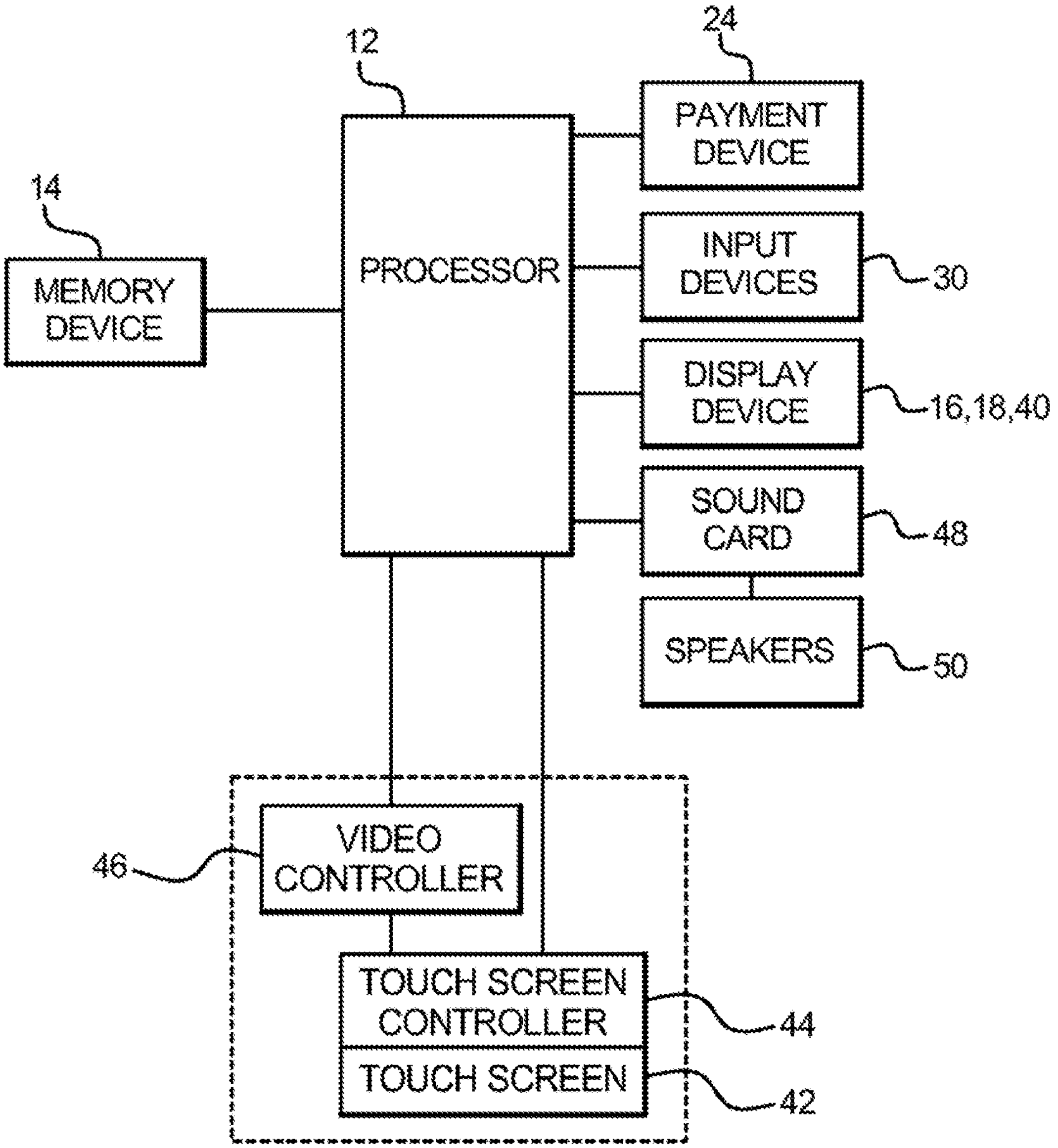
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as discussed in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as discussed above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
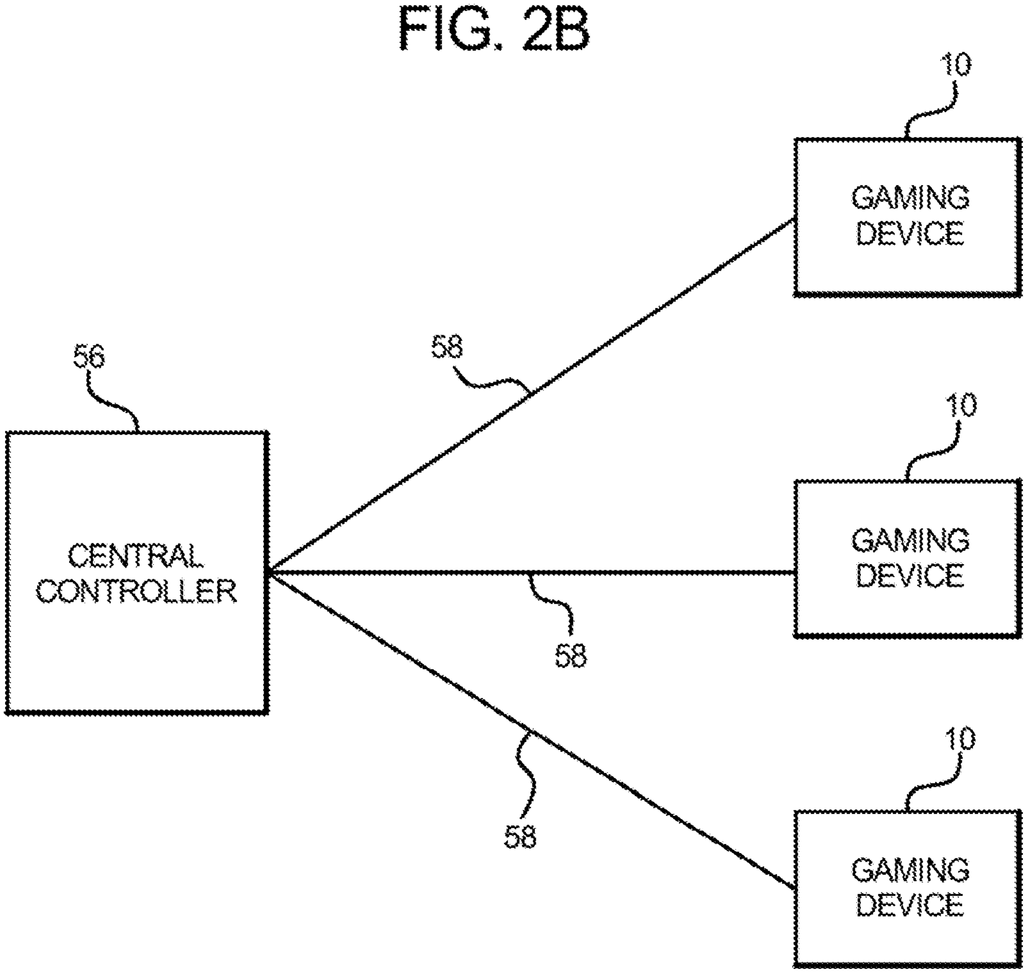
FIG. 2B is a schematic diagram of the central server in communication with a plurality of gaming devices in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Competition Sequence

Figure 3:
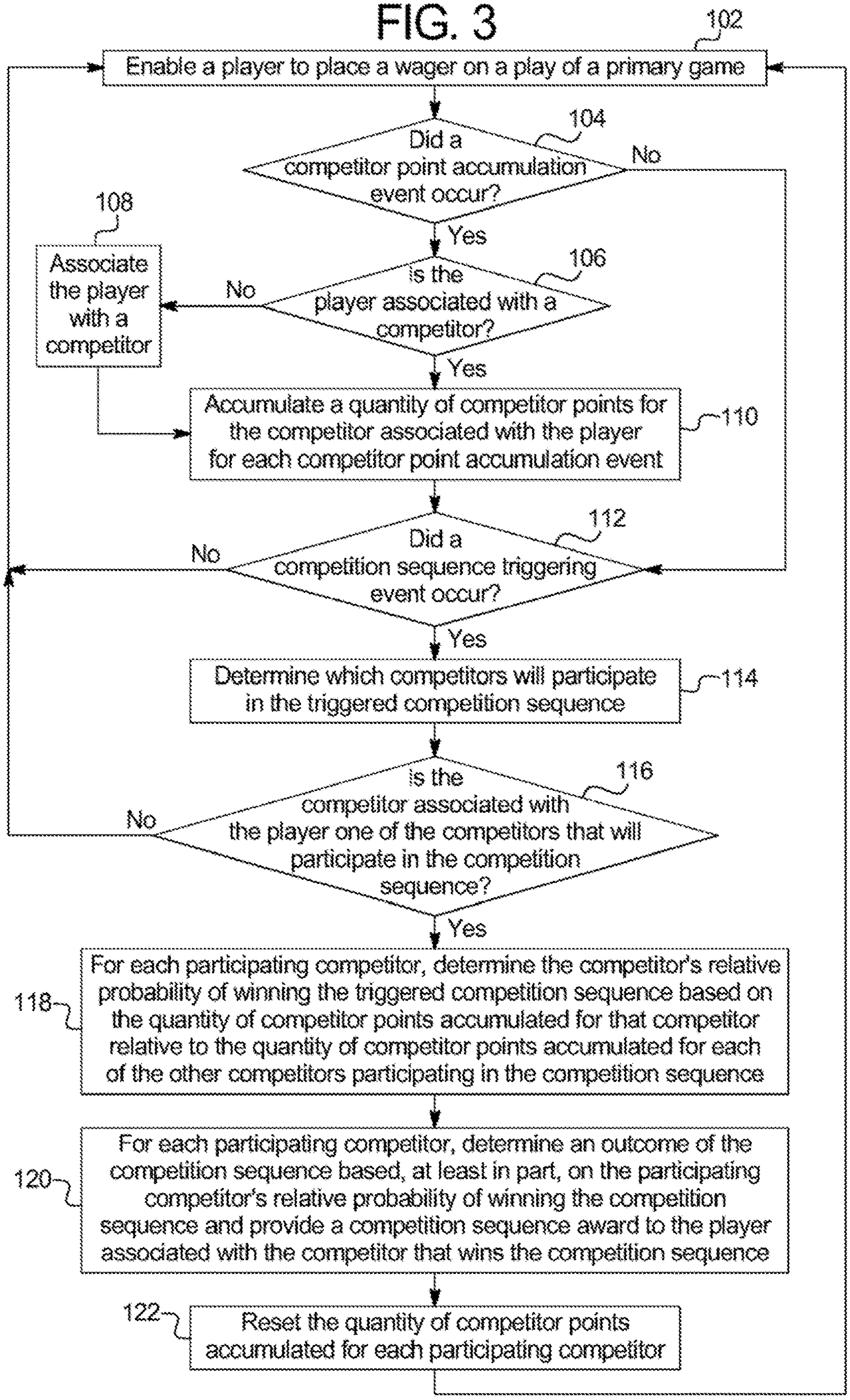
FIG. 3 is a flowchart illustrating a method of one embodiment of the gaming system disclosed herein and illustrating a player being associated with a competitor, the gaming system accumulating competitor points for the competitor and the gaming system determining an outcome of a triggered competition sequence based on the competitor points accumulated for the competitor.

Referring now to FIG. 3, a flowchart of an example process for operating a gaming system or a gaming device disclosed herein is illustrated. In one embodiment, this process is embodied in one or more software programs stored in one or more memories and executed by one or more processors or controllers. Although this process is described with reference to the flowchart illustrated in FIG. 3, it should be appreciated that many other methods of performing the acts associated with this process may be used. For example, the order of certain of the blocks described may be changed, or certain of the blocks described may be optional.

In operation of one embodiment, the gaming system enables a player to place a wager on a play of a primary game as indicated in block 102. In various embodiments, the primary game includes any suitable type of primary game, such as a slot game. The gaming system determines if a competitor point accumulation event occurs in association with the play of the primary game as indicated in diamond 104.

If a competitor point accumulation event occurs, the gaming system determines if the player (or gaming device the player is currently wagering at) is associated with a competitor as indicated in diamond 106. A competitor is representative of either an actual player (or user), or a virtual, gaming system controlled player. As discussed in greater detail below, in certain instances, a number of players eligible (or otherwise available) to participate in a competition sequence is less than a minimum number of players required to participate in the competition sequence. In these instances, the gaming system may employ one or more virtual, gaming system controlled players to participate in such competition sequences (such that the competition sequence includes the minimum number of competitors). For the competitor point accumulation sequence and the competition sequence, these virtual players and these actual players are each represented as a competitor. Accordingly, a competitor, as described herein is either associated with an actual player or is established by the gaming system as a virtual player to provide the necessary number of participants in a competition sequence.

In one embodiment, if the player (or gaming device the player is currently wagering at) is not associated with a competitor, the gaming system assigns or otherwise associates the player with a competitor as indicated in block 108. After the gaming system associates the player (or gaming device) with a competitor, or if the player (or gaming device) was already associated with a competitor, the gaming system accumulates a quantity of competitor points for the competitor for each competitor point accumulation event which occurs, as indicated in block 110. In one embodiment, the gaming system accumulates a quantity of competitor points for the competitor based on one or more of a plurality of different types of competitor point accumulation events which occur.

After accumulating any competitor points for the competitor, or if the gaming system determined that a competitor point accumulation event did not occur, the gaming system determines if a competition sequence triggering event occurs, as indicated in diamond 112. If the gaming system determines that a competition sequence triggering event does not occur, the gaming system returns to block 102. On the other hand, if the gaming system determines that a competition sequence triggering event occurs, the gaming system determines which competitors will participate in the triggered competition sequence as indicated in block 114. In one embodiment, if a competition sequence triggering event occurs and a player is not associated with a competitor, then the player will not be associated with a competitor that is participating in the triggered competition sequence. Thus, in this embodiment, regardless of whether a competition sequence triggering event occurs as indicated in diamond 112, if a player is not associated with a competitor, the gaming system returns to block 102 an enables the player to place a wager on another play of the primary game. After determining which competitors will participate in the triggered competition sequence, the gaming system then determines whether the competitor associated with the player is one of the competitors that will participate in the triggered competition sequence, as indicated in diamond 116. It should be appreciated that, in certain instances, as discussed in further detail below, the competitor associated with the player does not participate in the triggered competition sequence.

If the gaming system determines that the competitor associated with the player will not participate in the triggered competition sequence, the gaming system returns to block 102. On the other hand, if the gaming system determines that the competitor associated with the player will participate in the triggered competition sequence, the gaming system determines, for each participating competitor, the relative probability of the gaming system determining a designated outcome for the competitor for the triggered competition sequence (described hereinafter as the competitor winning the triggered competition sequence) based on the quantity of competitor points accumulated for that competitor relative to the quantity of competitor points accumulated for each of the other participating competitors, as indicated in block 118.

For example, referring now to the table illustrated in FIG. 4, a triggered competition sequence includes five different competitors (Competitors A to E) wherein the total quantity of competitor points accumulated for the five different competitors is two-hundred competitor points (e.g., 50+20+75+30+25=200). In this example, for each participating competitor, the gaming system determines the competitor's relative probability of winning the triggered competition sequence based on the quantity of competitor points accumulated for that competitor relative to the total quantity of competitor points accumulated for the participating competitors. Thus, Competitor A (who is associated with fifty competitor points) has a relative probability of winning the triggered competition sequence of twenty-five percent (i.e., 50/200=0.25=25%), Competitor B (who is associated with twenty competitor points) has a relative probability of winning the triggered competition sequence of ten percent (i.e., 20/200=0.10=10%), Competitor C (who is associated with seventy-five competitor points) has a relative probability of winning the triggered competition sequence of thirty-seven-and-a-half percent (i.e., 75/200=0.375=37.5%), Competitor D (who is associated with thirty competitor points) has a relative probability of winning the triggered competition sequence of fifteen percent (i.e., 30/200=0.15=15%), and Competitor E (who is associated with twenty-five competitor points) has a relative probability of winning the triggered competition sequence of twelve-and-a-half percent (i.e., 25/200=0.125=12.5%). In this example, it should be appreciated that because more competitor points have been accumulated for Competitor C relative to each of the other competitors, Competitor C has the highest probability of winning the triggered competition sequence.

Referring back now to FIG. 3, the gaming system determines, for each participating competitor, an outcome of the triggered competition sequence based, at least in part, on the participating competitor's relative probability of winning the triggered competition sequence and provides a competition sequence award to the player associated with the competitor that wins the triggered competition sequence, as indicated in block 120. In one embodiment, the gaming system only provides an award to the player associated with the competitor that wins the triggered competition sequence. For example, the gaming system provides an award of one-thousand credits to a player associated with a competitor that wins a competition sequence and zero credits to each of the other competitors participating in the triggered competition sequence. In another embodiment, the gaming system provides a plurality of awards to a plurality of the players associated with participating competitors. In another embodiment, the gaming system provides an award to each player associated with a competitor participating in the triggered competition sequence. That is, the gaming system provides awards to players associated with competitors that win the competition sequence and players associated with competitors that do not win the competition sequence. It should be appreciated that although different competitors in a competition sequence are associated with different relative probabilities of winning the triggered competition sequence, the outcome of the triggered competition sequence is determined based, at least in part, on one or more random determinations, and thus each one of the competitors participating in the triggered competition sequence has a potential to win (and thus each player associated with a participating competitor has a potential to win an award).

After providing any awards for the competition sequence, the gaming system resets the quantity of competitor points accumulated for each participating competitor, as indicated in block 122. In one embodiment, the gaming system resets the quantity of competitor points accumulated for each participating competitor to a quantity of zero. In another embodiment, the gaming system determines a quantity of competitor points to subtract from the quantity of competitor points accumulated for a participating competitor. In one such embodiment, the gaming system determines this quantity of competitor points to subtract from the quantity of competitor points accumulated for a competitor based, at least in part, on the determined outcome of the triggered competition sequence. Thus, in certain instances, one or more competitor points which are accumulated for a competitor persist for one or more subsequent plays of the game.

In one embodiment, the gaming system accumulates a quantity of competitor points for a plurality of different types of competitor point accumulation events. In one embodiment, the gaming system causes a competitor point accumulation event to occur based on a displayed event in a play of one or more displayed games on one or more of the gaming devices in the gaming system. In another embodiment, the gaming system causes a competitor point accumulation event to occur independent of any displayed event in any play of any game of any of the gaming devices in the gaming system. In another embodiment, a competitor point accumulation event occurs based on the occurrence of one or more suitable events occurring at or in association with one or more players and/or one or more gaming devices in the gaming system during a designated period of time, such as between triggered competition sequences. In another embodiment, the gaming system defines one or more game play parameters, wherein each time a player's tracked game play activity satisfies the defined parameter during a designated period of time, such as between triggered competition sequences, the gaming system causes a competitor point accumulation event to occur.

In another embodiment, a competitor point accumulation event occurs based on a wager placed (or a side wager placed). In one such embodiment, the side wager is placed by the player associated with the competitor. In another such embodiment, the side wager is placed by a player not associated with the competitor. Thus, the gaming system accumulates competitor points for a competitor (and thus increases a competitors probability of winning a subsequently triggered competition sequence) based on side wagers placed by one or more other players. In various embodiments, the gaming system accumulates different quantities of competitor points for different wager amounts (or different side wager amounts).

In another embodiment, a competitor point accumulation event alternatively or additionally occurs based on one or more events which occur independent of a specific wager amount. For example, a competitor point accumulation event occurs based on a bonus event occurring in association with the play of the primary game. In one embodiment, a competitor point accumulation event additionally or alternatively occurs based on one or more events which occur in association with the play of the bonus event. It should be appreciated that, in various embodiments, a competitor point accumulation event occurs based on any other suitable type event which occurs in association with the play of the primary game. In certain instances, the gaming system accumulates larger quantities of competitor points for competitors for any competitor point accumulation events which occur in association with the play of the bonus event relative to any competitor point accumulation events which occur in association with the play of the primary game.

In another embodiment, the gaming system accumulates a quantity of competitor points for a competitor based on an outcome of a previous competition sequence within which the competitor participated. In another embodiment, the gaming system provides a quantity of competitor points to a competitor based on the competitor participating in a competition sequence. Accordingly, in certain instances, by accumulating competitor points for a competitor based on a competition sequence within which the competitor participated, the gaming system provides that competitors can continue to increase their probability of winning a subsequent competition sequence by continuing to participate in competition sequences. It should be appreciated that, in certain instances, competitors that achieve winning outcomes in previous competition sequences have higher probabilities of achieving winning outcomes in future competition sequences relative to competitors that: (i) have not participated in previous competition sequences, and (ii) do not achieve winning outcomes in previous competition sequences.

In one alternative embodiment, rather than the gaming system determining which competitor to associate with a player, the gaming system enables the player to choose one of a plurality of different competitors. In this embodiment, if a player (or gaming device) is not already associated with a competitor, the gaming system displays a plurality of different competitors to the player and enables the player to pick a competitor from amongst the plurality of different competitors. The gaming system then associates the player with the picked competitor.

While the embodiments discussed above include associating a competitor with a player, in various alternative embodiments, the gaming system assigns or otherwise associates a competitor with a gaming device (rather than a player). In these embodiments, upon a suitable initiating condition, such as a competitor point accumulation event, the gaming system associates a competitor with the gaming device. It should be appreciated that by associating a competitor with a gaming device, a plurality of players can each be associated with the competitor at a plurality of different points in time.

As discussed above, the gaming system accumulates competitor points for a plurality of different types of competitor point accumulation events. In one embodiment, the gaming system accumulates a same quantity of competitor points for a competitor for a plurality of different types of competitor point accumulation events. In another embodiment, the gaming system accumulates a different quantity of competitor points for the competitor for a plurality of the different types of competitor point accumulation events. For example, the gaming system accumulates the same or a different quantity of competitor points for a competitor based on different competition sequences within which that competitor participates. In another example, the gaming system provides the same or different quantities of competitor points to different players associated with competitors which are participating in a same competition sequence. In one embodiment, the gaming system determines a quantity of competitor points to provide a competitor based on the player status level of a player associated with that competitor. Thus, the gaming system accumulates a first quantity of competitor points for a participating competitor that is associated with a first player having a first player status level and accumulates a second, different quantity of competitor points for a participating competitor that is associated with a second player having a second, different player status level.

In one embodiment, a competition sequence triggering event occurs based on a displayed event occurring in association with a play of one or more displayed games on one or more of the gaming devices in the gaming system. In another embodiment, a competition sequence triggering event occurs independent of any displayed event occurring in association with any play of any game on any gaming device in the gaming system. In another embodiment, the gaming system defines one or more game play parameters, wherein each time a player's tracked game play activity satisfies the defined parameter during a designated period of time, such as between triggered competition sequences, the gaming system causes a competition sequence triggering event to occur.

In one embodiment, the gaming system determines which competitors will participate in the triggered competition sequence. In one embodiment, the gaming system enables each competitor associated with a player currently wagering at a gaming device in the gaming system to participate in the triggered competition sequence. In one such embodiment, the gaming system automatically causes each competitor associated with a player currently wagering at a gaming device in the gaming system to participate in the triggered competition sequence. In another embodiment, the gaming system automatically causes a plurality of competitors associated with a plurality of players currently wagering at gaming devices in the gaming system to participate in the triggered competition sequence (i.e., the gaming system does not cause each competitor associated with a player currently wagering at a gaming device in the gaming system to participate in the triggered competition sequence).

In one alternative embodiment, the gaming system enables a player currently wagering at a gaming device in the gaming system who is associated with the competitor to determine whether or not the competitor will participate in a triggered competition sequence. In this embodiment, the gaming system displays one or more messages to the player that a competition sequence triggering event has occurred. The gaming system then enables the player to elect whether to associate the competitor with the triggered competition sequence. Thus, in this embodiment, the gaming system enables a player associated with a competitor to prevent that competitor from participating in the competition sequence. Accordingly, by enabling the player to prevent the competitor from participating in the triggered competition sequence the gaming system provides that the competitor can continue to accumulate competitor points (and thus increase the relative probability of winning a subsequently triggered competition sequence).

Figure 5:
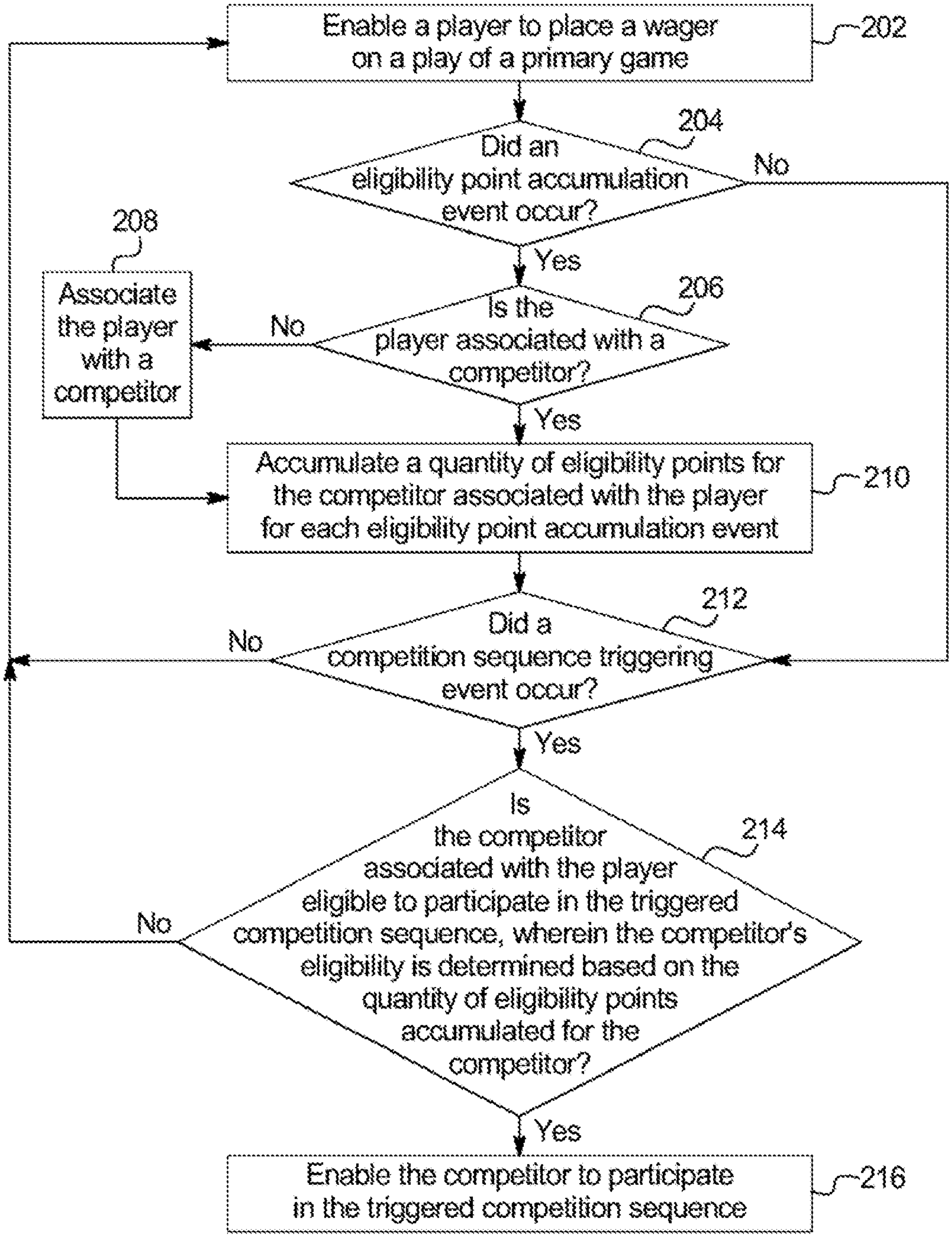
FIG. 5 is a flowchart illustrating a method of one embodiment of the gaming system disclosed herein and illustrating a player being associated with a competitor, the gaming system accumulating eligibility points for the competitor and the gaming system determining the competitor's eligibility to participate in a triggered competition sequence based on the eligibility points accumulated for the competitor.

Referring now to FIG. 5, a flowchart of an example process for operating a gaming system or a gaming device disclosed herein is illustrated. In one embodiment, this process is embodied in one or more software programs stored in one or more memories and executed by one or more processors or controllers. Although this process is described with reference to the flowchart illustrated in FIG. 5, it should be appreciated that many other methods of performing the acts associated with this process may be used. For example, the order of certain of the blocks described may be changed, or certain of the blocks described may be optional.

In operation of one embodiment, the gaming system enables a player to place a wager on a play of the primary game (such as a slot game) as indicated in block 202. The gaming system then determines if an eligibility point accumulation event occurs, as indicated in diamond 204. In one embodiment, an eligibility point accumulation event occurs based on a displayed event occurring in association with a play of one or more displayed games on one or more of the gaming devices in the gaming system. In another embodiment, an eligibility point accumulation event occurs independent of any displayed event occurring in association with any play of any game on any gaming device in the gaming system.

If the gaming system determines that an eligibility point accumulation event occurs, the gaming system determines if the player (or gaming device the player currently wagering at) is associated with a competitor and if the player (or gaming device) is not associated with a competitor, the gaming system associates the player (or gaming device) with a competitor, as indicated in diamond 206 and block 208, and as discussed above.

In one embodiment, the gaming system accumulates a quantity of eligibility points for the competitor associated with the player for each eligibility point accumulation event, as indicated in block 210. In one embodiment, the gaming system accumulates a quantity of eligibility points for a competitor based on one or more wager related events which occur in association with a play of the primary game on a gaming device at a gaming establishment. For example, the gaming system accumulates a quantity of eligibility points for a competitor based on a placement of a wager and a generation of a designated symbol combination. In another embodiment, the gaming system additionally or alternatively accumulates a quantity of eligibility points for a competitor based on one or more non-wager related events which occur remote from any gaming establishment (or occur in association with a device which is not a gaming device upon which a wager may be placed). For example, the gaming system accumulates a quantity of eligibility points for a competitor if a player associated with the competitor makes one or more inputs remote from any gaming establishment to associate the competitor with a triggered competition sequence (e.g., the player enters the competitor in the triggered competition sequence from a home computer via a data network, such as an internet).

After accumulating any eligibility points for the competitor, or if the gaming system determined that an eligibility point accumulation event did not occur, the gaming system determines if a competition sequence triggering event occurs, as indicated in diamond 212, and as discussed above. If the gaming system determines that a competition sequence triggering event occurs, the gaming system triggers a competition sequence and determines whether the competitor associated with the player is eligible to participate in the triggered competition sequence, wherein the competitor's eligibility is determined based on the quantity of eligibility points accumulated for the competitor, as indicated in diamond 214.

In one embodiment, if a competition sequence triggering event occurs and a player is not associated with a competitor, then the player will not be associated with a competitor that is eligible to participate in the triggered competition sequence. Thus, in this embodiment, regardless of whether a competition sequence triggering event occurs as indicated in diamond 212, if a player is not associated with a competitor, the gaming system returns to block 202 and enables the player to place a wager on another play of the primary game. It should be appreciated that, in various embodiments, the competitor's eligibility to participate in the triggered competition sequence is determined based on one or more events which occur at a gaming establishment and additionally or alternatively based on one or more events which occur remote from any gaming establishment.

If the gaming system determines that the competitor associated with the player is not eligible to participate in the triggered competition sequence, the gaming system returns to block 202. On the other hand, if the gaming system determines that the competitor associated with the player is eligible to participate in the triggered competition sequence, the gaming system enables the competitor to participate in the triggered competition sequence as indicated in block 216.

While the embodiments discussed above include determining a competitor's eligibility to participate in a competition sequence based on a quantity of eligibility points accumulated for the competitor, it should be appreciated that, in certain embodiments, the gaming system determines a competitor's eligibility to participate in the competition sequence based on the quantity of competitor points accumulated for a competitor. That is, in these embodiments, rather than accumulate eligibility points and competitor points for a competitor, the gaming system accumulates competitor points for the competitor and, based on the quantity of competitor points accumulated for the competitor, the gaming system determines: (i) the competitor's eligibility to participate in a triggered competition sequence, and (ii) the competitor's relative probability of winning the triggered competition sequence.

As discussed above, in certain instances, the gaming system employs a dual point structure, wherein the gaming system accumulates both eligibility points for a competitor and competitor points for the competitor. In one embodiment, the gaming system accumulates a quantity of eligibility points for each eligibility point accumulation event which occurs. In one embodiment, an eligibility point accumulation event occurs based on a displayed event occurring in association with a play of one or more displayed games on one or more gaming devices in the gaming system. In another embodiment, the gaming system defines one or more game play parameters, wherein each time a player's tracked game play activity satisfies the defined parameter during a designated period of time, such as between triggered competition sequences, an eligibility point accumulation event occurs. In another embodiment, an eligibility point accumulation event occurs based on a wager placed (or a side wager placed). In one such embodiment, the side wager is placed by the player associated with the competitor. In another such embodiment, as discussed above, the side wager is placed by a player not associated with the competitor. In various embodiments, the gaming system accumulates different quantities of eligibility points for different wager amounts (or different side wager amounts).

In another embodiment, an eligibility point accumulation event alternatively or additionally occurs based on one or more events which occur independent of a specific wager amount. For example, in one embodiment, an eligibility point accumulation event occurs based on a bonus event occurring in association with the play of the primary game. In another embodiment, an eligibility point accumulation event additionally or alternatively occurs based on one or more events which occur in association with the play of the bonus event. In various other embodiments, an eligibility point accumulation event occurs based on any other suitable type event which occurs in association with the play of the primary game. In one embodiment, the gaming system utilizes one or more meters or counters to track (or monitor) the quantity of eligibility points accumulated for the competitor. In certain instances, the gaming system accumulates greater quantities of competitor points for competitors for any competitor point accumulation events which occur in association with the play of the bonus event relative to any competitor point accumulation events which occur in association with the play of the primary game.

In one embodiment, the gaming system determines a competitor's eligibility to participate in a competition sequence based on that competitor's quantity of eligibility points. In one embodiment, the gaming system maintains one or more of the eligibility points which are accumulated for the competitor for one or more subsequent plays of the game. That is, the quantity of eligibility points accumulated for the competitor persist for subsequent plays of the game. By enabling eligibility points accumulated for competitors to persist for subsequent plays of the game, the gaming system enables competitors to accumulate large quantities of eligibility points and thus become eligible to participate in higher level competition sequences (i.e., competition sequences which require greater quantities of eligibility points for eligibility) which may be associated with better awards, as discussed in more detail below.

In one alternative embodiment, the gaming system maintains a plurality of different competition sequences. The gaming system ranks or otherwise organizes each of these different competition sequences into one of a plurality of different levels. In one embodiment, the gaming system provides different awards for different level competition sequences. In one such embodiment, the gaming system associates a level with a competition sequence based on the awards associated with that triggered competition sequence (i.e., based on one or more awards a player associated with a competitor participating in the competition is eligible to win). In another such embodiment, if a competition sequence triggering event occurs, the gaming system triggers a competition sequence and randomly determines one or more awards to associate with the triggered competition sequence. In this embodiment, the gaming system then assigns or otherwise associates a level (and thus a designated quantity of eligibility points) with the triggered competition sequence based on the one or more awards associated with that triggered competition sequence.

In one embodiment, a competitor's eligibility to participate in the triggered competition sequence having a designated level is determined based on whether the competitor has accumulated a minimum required quantity of eligibility points for that competition sequence. In another embodiment, a competitor's eligibility to participate in the triggered competition sequence having a designated level is determined based on whether the competitor has accumulated a minimum required quantity of competitor points for that competition sequence. In another embodiment, a competitor's eligibility to participate in the triggered competition sequence having a designated level is determined based on the player's status level. In one embodiment, higher level competition sequences (e.g., competition sequences associated with higher designated quantities of eligibility points) are associated with larger awards relative to lower level competition sequences. Thus, in this embodiment, competitors that have higher accumulated quantities of eligibility points (or a higher player status level) are eligible to win larger awards.

For example, referring now to the table illustrated in FIG. 6, the gaming system maintains Competition Sequences A to C. In this example, Competition Sequence A is associated with an award of $10.00 being provided to a player associated with a competitor that wins the triggered competition sequence, wherein a competitor eligible to participate in Competition Sequence A must have at least one eligibility point. Competition Sequence B is associated with an award of $100.00 being provided to a player associated with a competitor that wins the triggered competition sequence, wherein a competitor eligible to participate in Competition Sequence B must have at least two eligibility points. Competition Sequence C is associated with an award of $200.00 being provided to a player associated with a competitor that wins the triggered competition sequence, wherein a competitor eligible to participate in Competition Sequence C must have at least eleven eligibility points.

In one embodiment, different competition sequences are associated with different probabilities of being triggered. For example, a plurality of different competition sequences are associated with a plurality of different designated symbol combinations, wherein if one of the plurality of different designated symbol combinations is generated in association with the primary game the competition sequence associated with that symbol combination is thus triggered. In this example, if each one of the plurality of different symbol combinations is associated with a different probability of being generated in association with the primary game, then the plurality of competition sequences associated with the plurality of designated symbol combinations are thus associated with different probabilities of being triggered.

Figure 7:
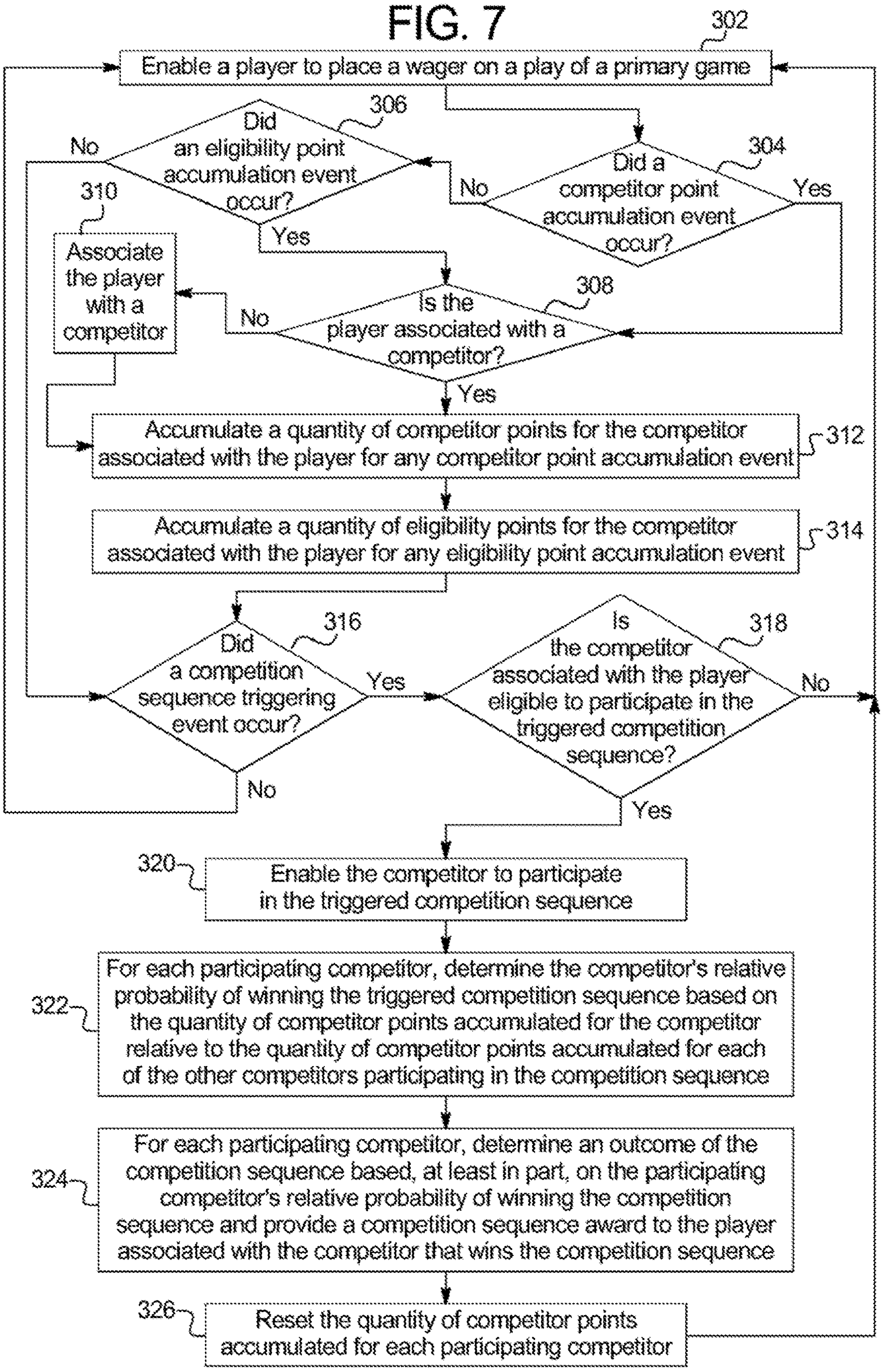
FIG. 7 is a flowchart illustrating a method of one embodiment of the gaming system disclosed herein and illustrating a player being associated with a competitor, the gaming system accumulating competitor points and eligibility points for the competitor, determining the competitor's eligibility to participate in a triggered competition sequence and the determining an outcome of the triggered competition sequence based on the competitor points accumulated for the competitor.

Referring now to FIG. 7, a flowchart of an example process for operating a gaming system or a gaming device disclosed herein is illustrated. It should be appreciated that while the examples discussed below refer to a competition sequence which includes a horse race game, any other suitable type of game can be implemented in accordance with the triggered competition sequence of the embodiments disclosed herein. In one embodiment, this process is embodied in one or more software programs stored in one or more memories and executed by one or more processors or controllers. Although this process is described with reference to the flowchart illustrated in FIG. 7, it should be appreciated that many other methods of performing the acts associated with this process may be used. For example, the order of certain of the blocks described may be changed, or certain of the blocks described may be optional.

In operation of one embodiment, the gaming system enables a player to place a wager on a play of a primary game and determines if a competitor point accumulation event occurs as indicated in blocks 302 and 304, and as discussed above. If the gaming system determines that a competitor point accumulation event does not occur, the gaming system determines if an eligibility point accumulation event occurs as indicated in diamond 306.

If an eligibility point accumulation event occurs, or if the gaming system determines that a competitor point accumulation event occurs, or if the gaming system determines that both an eligibility point accumulation event and a competitor point accumulation event occur, the gaming system determines if the player (or gaming device the player is currently wagering at) is associated with a competitor as indicated in diamond 308.

Figure 8:
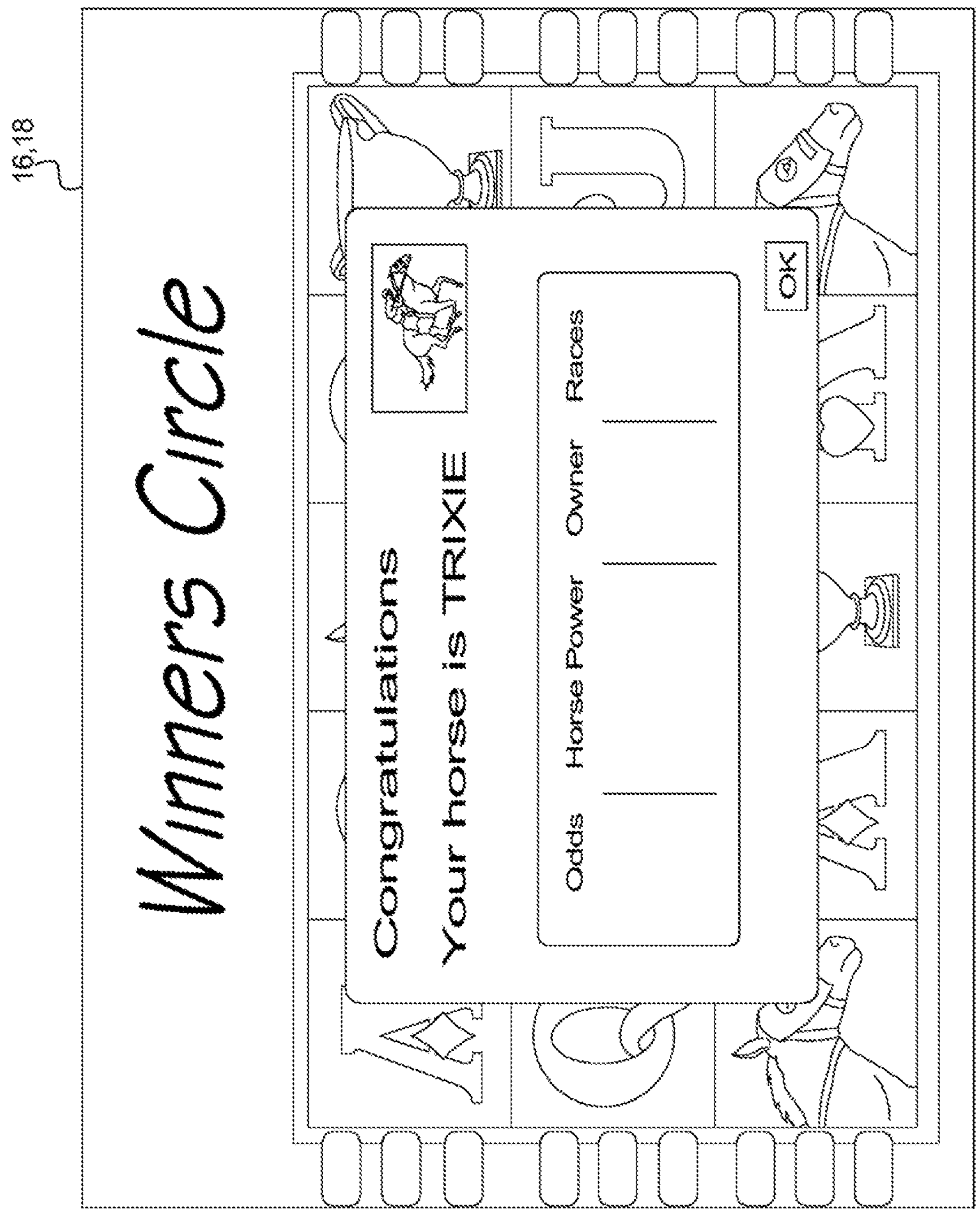
FIG. 8 is a front perspective view of the display of one embodiment of the gaming system disclosed herein illustrating a competitor being associated with a competitor.

If the gaming system determines that the player (or gaming device) is not associated with a competitor, the gaming system assigns or otherwise associates the player (or gaming device) to a competitor as indicated in block 310, and as discussed above. For example, FIG. 8 illustrates the gaming system associating the player with a horse named "TRIXIE". In this example, the gaming system and displays appropriate messages such as "Congratulations" and "Your horse is TRIXIE" to the player visually, or through suitable audio or audiovisual displays.

Referring back now to FIG. 7, in one embodiment, after associating the player (or gaming device) with a competitor, or if the player (or gaming device) was already associated with a competitor, the gaming system accumulates a quantity of competitor points for the competitor associated with the player for any competitor point accumulation events which occur, as indicated in block 312. For example, after the gaming system associates the player with "TRIXIE", the gaming system accumulates a first quantity of horse power points (i.e., competitor points) for TRIXIE based on the player's placed wager. Continuing with this example, during the play of the primary game (e.g., a slot game) a designated symbol combination is generated and displayed and the gaming system accumulates a second quantity of horse power points (in addition to the first quantity of horse power points) for TRIXIE based on the displayed designated symbol combination.

In addition to accumulating a quantity of competitor points for the competitor associated with the player, the gaming system additionally accumulates a quantity of eligibility points for the competitor associated with the player for any eligibility point accumulation events which occur, as indicated in block 314. In one embodiment, the gaming system accumulates eligibility points for a competitor based on one or more inputs made by a player associated with the competitor, wherein the inputs are made at a location which is remote from any gaming establishment.

After accumulating any competitor points and any eligibility points, or if neither a competitor point accumulation event or an eligibility point accumulation event occur as indicated in diamonds 304 and 306, the gaming system determines if a competition sequence triggering event occurs as indicated in diamond 316, and as discussed above. If the gaming system determines that a competition sequence triggering event does not occur, the gaming system returns to block 302. If the gaming system determines that a competition sequence triggering event occurs, the gaming system triggers a competition sequence and determines if the competitor associated with the player is eligible to participate in the triggered competition sequence, wherein the competitor's eligibility is determined based on the quantity of eligibility points accumulated for the competitor as indicated in diamond 318. In one embodiment, as discussed above, regardless of whether a competition sequence triggering event occurs as indicated in diamond 316, if a player is not associated with a competitor, the gaming system returns to block 302 and enables the player to place a wager on another play of the primary game.

If the gaming system determines that the competitor is eligible to participate in the triggered competition sequence, the gaming system enables the competitor to participate in the triggered competition sequence and determines each participating competitor's relative probability of winning the triggered competition sequence as indicated in blocks 320 and 322. It should be appreciated that, in certain embodiments, each participating competitor's relative probability of winning the competition sequence is determined independent of the quantity of eligibility points accumulated for that competitor. That is, for the embodiments which include eligibility points being accumulated independent of and distinct from competitor points, the competitor's relative probability of winning the competition sequence is governed by the quantity of competitor points (which are distinct from the quantity of eligibility points) accumulated for that competitor.

After determining each competitor's relative probability of winning the competition sequence, the gaming system determines, for each participating competitor, an outcome of the triggered competition sequence based, at least in part, on the participating competitor's relative probability of winning the triggered competition sequence and provides a competition sequence award to the player associated with the competitor that wins the competition sequence, as indicated in block 324. After providing awards based on the outcome of the triggered competition sequence, the gaming system resets each competitor's accumulated quantity of competitor points, as indicated in block 326, and as discussed above.

In one embodiment, the gaming system employs a remote user interface (such as a website accessible via a data network such as an internet). In one embodiment, the gaming system enables users (i.e., players that are remote from any gaming establishment) to make a plurality of different inputs to modify a plurality of different parameters associated with their competitors. In one embodiment, these parameters include competitor attributes (such as a physical size of a competitor, a physical appearance of the competitor and the competitor's training schedule). In another embodiment, the gaming system enables users to make one or more inputs, via the remote user interface, to associate their competitors with one or more competition sequences which are scheduled to occur.

Figure 9:
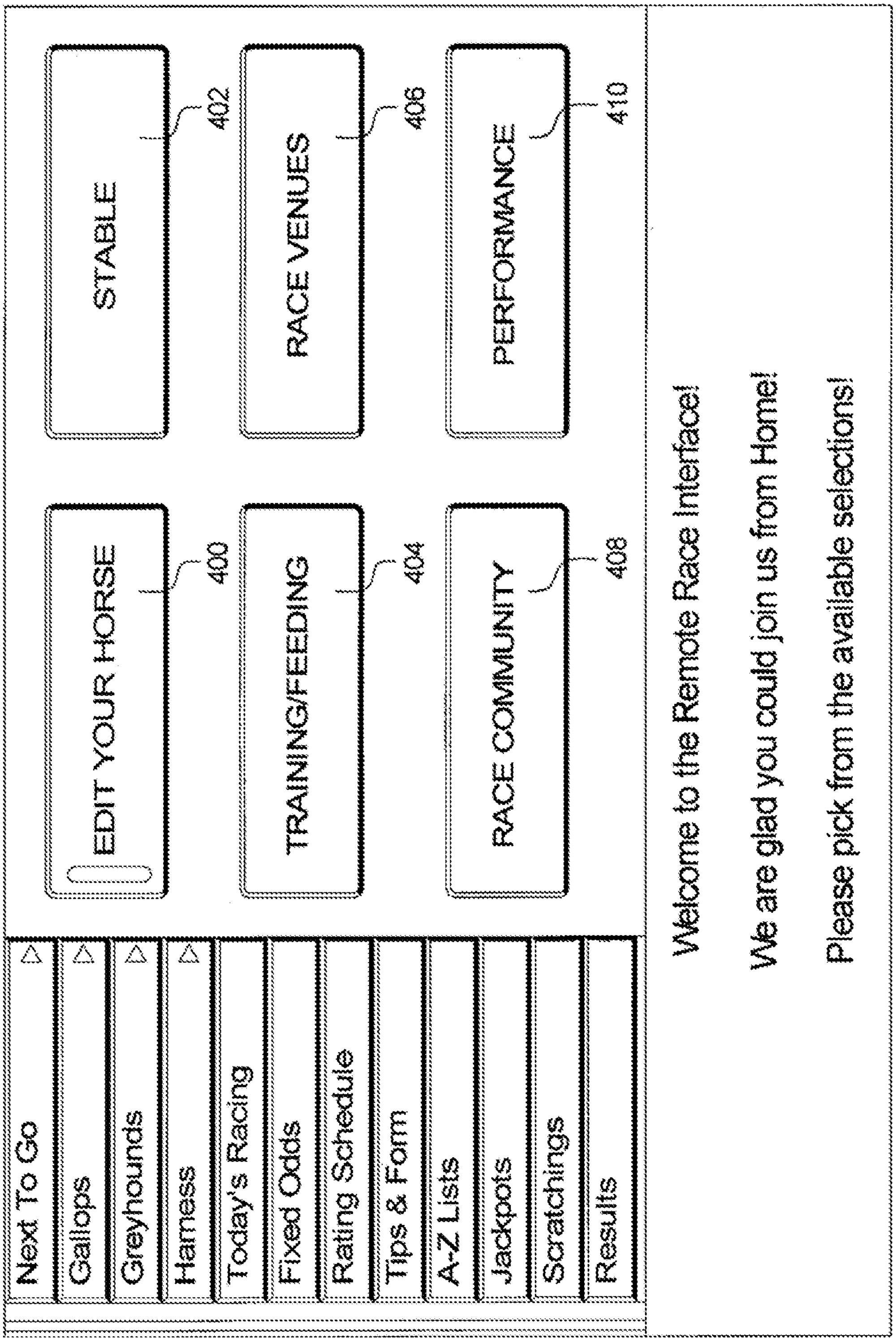
FIG. 9 is a front perspective view of the display of one embodiment of the gaming system disclosed herein illustrating a remote user interface wherein users make one of a plurality of different inputs to modify one or more of a plurality of different parameters associated with competitors.

For example, FIG. 9 illustrates a remote user interface, wherein the gaming system enables users to make a plurality of different selections (i.e., inputs) from a location remote from any gaming establishment (e.g., from a home computer) to manage their horses. In this example, the remote user interface enables users to both view and modify various different parameters associated with their horses. In one embodiment, the gaming system determines whether to accumulate any eligibility points for a competitor based on any inputs made by a user to modify one or more of the parameters associated with the users competitor. When the user accesses the remote interface illustrated in FIG. 9, the gaming system displays appropriate messages such as "Welcome to the Remote Race Interface!" and "We are glad you could join us from Home!" and "Please pick from the available selections" to the user visually, or through suitable audio or audiovisual displays.

Users navigate the remote user interface by selecting one or more of a plurality of different selections 400 to 410. For example, selection 400, "EDIT YOUR HORSE" enables users to pick a plurality of different options which modify parameters associated with their horse including but not limited to: a plurality of different horse colors; a plurality of different horse tail lengths, a plurality of different horse main lengths, a plurality of different horse hair lengths, a plurality of different physical horse sizes, a plurality of different types of horse shoes and a plurality of different horse jockeys. Additionally, selection 402, "STABLE", enables users to pick a plurality of different options including but not limited to: a plurality of different stables and a plurality of different stalls. Selection 404, "Training/Feeding" enables users to select different options including but not limited to: a plurality of different training schedules, a plurality of different trainers and a plurality of different types of horse feed.

In one embodiment, the gaming system also enables users to associate their competitors with one or more competition sequences via the remote user interface. For example, by selecting the "RACE VENUES" selection 406 a user can view information including but not limited to: past, current, and upcoming races which have occurred, which are currently taking place or which are scheduled to occur at one or more different race venues (i.e., hosted by one or more gaming establishments). In one embodiment, if a competitor associated with a user is eligible to participate in an upcoming competition sequence, the gaming system enables the user to enter or otherwise associate their competitor with that upcoming competition sequence by making one or more inputs via the remote user interface.

In addition to utilizing the remote user interface to cause the gaming system to accumulate a quantity of eligibility points for a competitor, the gaming system also enables users to interact with one another via the remote user interface. For example, by selecting the "RACE COMMUNITY" selection 408 of FIG. 9, users can interact with one another through elements such as a plurality of different discussion forums. In one embodiment, users utilize these different discussion forums to discuss upcoming race events and topics relating to their horses. In one embodiment, users utilize these discussion forums and other various remote user interface options to buy, sell and trade competitors.

Additionally, the gaming system enables users to monitor a plurality of different statistics and attributes associated with their competitor via the remote user interface. For example, by selecting the "PERFORMANCE" selection 410, users can view statistics and attributes associated with their horse, including but not limited to: current horse power, current horse eligibility, previous races their horse participated in and the corresponding finishing position for those races and future races their horse is scheduled to participate in.

In one embodiment, the gaming system accumulates different quantities of eligibility points for a competitor based on different combinations of competitor parameters. For example, the gaming system accumulates a first quantity of eligibility points for a horse for a first type of feed in combination with a first training schedule and accumulates a second, different quantity of eligibility points for the horse for a second, different type of feed in combination with a second, different training schedule.

In one embodiment, the gaming system determines a quantity of eligibility points to accumulate for a competitor based on a competition sequence the competitor is scheduled to participate in and based on one or more parameters currently associated with the competitor. For example, a horse is scheduled to participate in a race at a race venue wherein the track is a first length. In this example, the gaming system accumulates more eligibility points for a horse if the horse's training parameter is based on the first track length as opposed to if the horse's training parameter is based on a second, different track length.

In one embodiment, the gaming system enables a player to pay a monetary amount in exchange for one or more modifications to one or more parameters associated with the player's competitor. In another embodiment, each modification of a parameter associated with a player's competitor requires a designated quantity of remote user interface credits or tokens. In one embodiment, the gaming system accumulates remote user interface credits for a competitor based on one or more events which occur in association with one or more plays of the primary game at a gaming establishment. In another embodiment, the gaming system accumulates remote user interface credits for a competitor associated with a player if the player performs one or more predetermined or designated actions at a gaming establishment or remote from any gaming establishment. For example, the gaming system accumulates remote user interface credits for a competitor associated with a player if the player:

(1) answers a predetermined quantity of designated surveys or questions of a designated survey,
(2) views a predetermined quantity of designated promotions,
(3) visits a designated website,
(4) spends a designated amount of time viewing one or more designated websites,
(5) purchases a designated item on one or more designated websites,
(6) makes a designated quantity of purchases on one or more designated websites, and/or
(7) performs any suitable predetermined or designated action at a gaming establishment or remote from any gaming establishment.

In one embodiment, when a player makes an input to modify one of the parameters associated with their competitor via the remote user interface, the gaming system deducts a designated quantity of user interface credits from the accumulated quantity of user interface credits associated with that player. Thus, because the gaming system, in certain instances, determines whether to accumulate eligibility points for a competitor based on one or more modifications to one or more parameters associated with the competitor, and because the player may potentially utilize these remote user interface credits to modify one or more parameters associated with their competitor, in certain instances, players may earn eligibility points and/or competitor points by accumulating and utilizing remote user interface credits. Thus, in certain instances, remote user interface credits are converted into eligibility points. It should be appreciated that player's may additionally convert player tracking and/or loyalty points into eligibility points and/or competitor points.

In one embodiment, the gaming system displays each participating competitors probability of winning the triggered competition sequence and enables a plurality of players (both players associated with competitors participating in a triggered competition sequence and players not associated with competitors participating in the triggered competition sequence) to place wagers in association with the triggered competition sequence. In one embodiment, the gaming system enables players to place wagers on the outcome of the triggered competition sequence, such as a finishing order of competitors participating in the triggered competition sequence. In another embodiment, the gaming system enables players to place wagers on any one of the competitors participating in the triggered competition sequence. In another embodiment, the gaming system enables a player to place a plurality of wagers on a plurality of competitors participating in a competition sequence.

Figure 10:
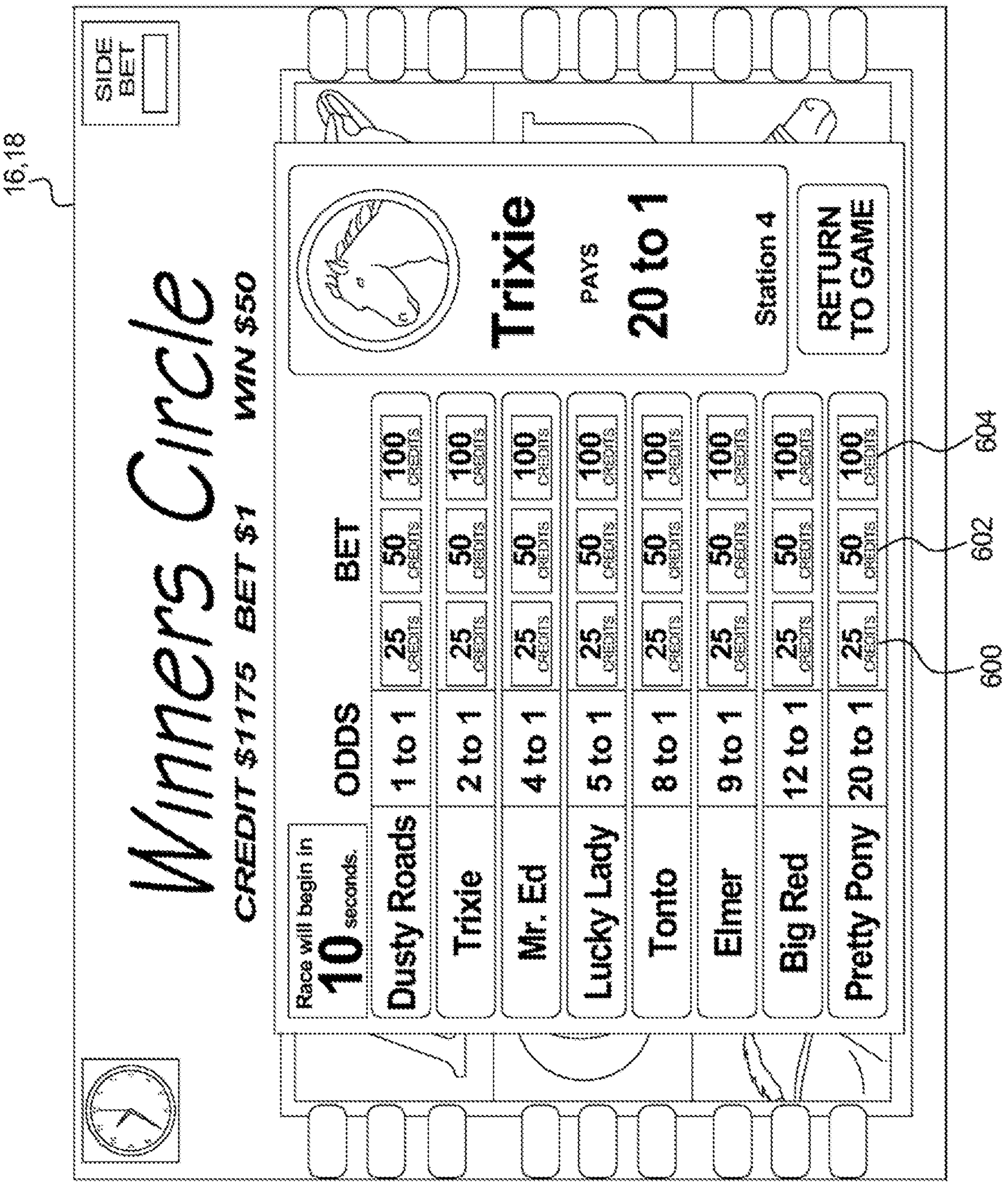
FIG. 10 is a front perspective view of the display of one embodiment of the gaming system disclosed herein illustrating a plurality of different wagers the gaming system enables a player to place in association with a triggered competition sequence.

For example, as seen in FIG. 10, the gaming system displays the odds of each participating horse winning an upcoming horse race (which are determined based, at least in part, on each horses relative probability of winning the race). In this example, the gaming system displays a plurality of betting options 600 to 604 next to the odds displayed for each horse. In this example, the gaming system enables players to bet 25 credits, 50 credits, or 100 credits on any one of the horses participating in the race by selecting either betting option 600, 602 or 604, respectively. By displaying each competitor's relative probability of winning the triggered competition sequence, the gaming system provides that players can determine which competitors have a better probability of winning the triggered competition sequence (and thus which competitors to place wagers on).

In one embodiment, the gaming system provides a competition sequence award to the player associated with the competitor that wins the triggered competition sequence. In one embodiment, the gaming system additionally provides awards to any players that place wagers on a winning competitor, wherein each provided award is determined based on the player's placed wager and the competitor's probability of winning the triggered competition sequence. It should be appreciated that by enabling players to wager on competitors participating in a triggered competition sequence which are associated with other players (or which are not associated with any player, a discussed in more detail below), the gaming system provides that a player does not have to be associated with a competitor to win an award in association with the triggered competition sequence. It should also be appreciated that by enabling players to wager on competitors associated with other players, the gaming system provides that players have a plurality of different opportunities to win an award in association with a competition sequence.

For example, if a competitor associated with a player wins a competition sequence, the gaming system provides a first award (such as a competition sequence award) to the player based on the competitor winning the triggered competition sequence. In this example, if the player associated with the competitor that wins the competition sequence placed an additional wager that their competitor would win the triggered competition sequence, the gaming system provides that player a second award based, at least in part, on the player's additional wager and the competitor's probability of winning the triggered competition sequence. For example, if the horse named "Tonto" wins the race, the gaming system provides a competition sequence award to the player associated with "Tonto". In this example, if the player associated with "Tonto" placed an additional bet of 25 credits (via the bet 25 credits betting option 600) that "Tonto" would win the race, the gaming system provides that player an award of 200 credits (i.e. 25 credits*8 to 1 odds=200 credits) in addition to the provided competition sequence award. It should be appreciated that, in this example, the gaming system also provides an award to each additional player that placed a bet (such as a side bet) that "Tonto" would win the race.

In one embodiment, if a player associates a competitor with a competition sequence from a location that is remote from a gaming establishment, the gaming system does not provide any award having any monetary value to the player, regardless of the determined outcome of the triggered competition sequence. For example, referring now to FIG. 11, a competition sequence includes five players (Player 1 to Player 5) which are associated with five competitors (Competitor A to Competitor E), respectively. In this example, Player 1 associates Competitor A with the triggered competition sequence from a location remote from the gaming establishment. Thus, as seen by the "N/A" in the award column for Competitor A, the gaming system does not provide an award having any monetary value to Player 1 if Competitor A wins the triggered competition sequence.

In one embodiment, if a quantity of competitor points are accumulated for a competitor based on one or more events which occur in association with a play of a primary game (i.e., at a gaming establishment) and the player associated with the competitor subsequently associates the competitor with a competition sequence by making one or more inputs from a location that is remote from a gaming establishment, the previously accumulated competitor points are not reset after the gaming system determines an outcome of the triggered competition sequence.

In one embodiment, the gaming system determines competition sequence awards to associate with a competition sequence based on an allocated portion of each wager placed between triggered competition sequences. For example, if $5,000.00 has been wagered since a last competition sequence and 5% of each wager is allocated to the awards of a subsequently triggered competition sequence, the gaming system provides $250.00 (i.e., 5%*$5,000.00=$250.00) worth of awards to the competitors participating in the triggered competition sequence. In another embodiment, the gaming system determines a competition sequence award additionally or alternatively based on an allocated portion of each additional wager (e.g., side wagers) placed on the triggered competition sequence. In another embodiment, the gaming system increments a value of a competition sequence award based on the accumulation of competitor points for one or more competitors. In another embodiment, the gaming system determines a competition sequence award based on any other suitable criteria.

In one embodiment, the gaming system provides for advertising/sponsorship opportunities. In one embodiment, a plurality of displayable advertisement spaces are associated with each competition sequence. In another embodiment, a plurality of displayable advertisement spaces are additionally or alternatively associated with a remote user interface (such as a website). In this embodiment, the gaming system enables one or more of the advertisement spaces to be purchased, wherein, for each purchased advertisement space, the gaming system displays an advertisement. In one embodiment, a portion of the proceeds collected for each purchased advertisement space is accumulated in one or more award pools. In this embodiment, one or more of these award pools are utilized for one or more of the competition sequence awards. In another embodiment, all of the proceeds collected for each advertisement space that is purchased are accumulated in one or more of the award pools (utilized to fund competition sequence awards). In another embodiment, the gaming system enables one or more entities to sponsor a competition sequence, wherein the award provided in association with the competition sequence is funded via the entity sponsoring that competition sequence.

In one alternative embodiment, the gaming system enables players to select or otherwise determine which advertisements will be associated with a competition sequence. In one embodiment, the gaming system increments a value of a competition sequence award based on a player selecting one or more advertisements to be displayed in association with the competition sequence. In another embodiment, the gaming system provides a player a benefit for selecting one or more advertisements to be displayed in association with a competition sequence. It should be appreciated that the gaming system may provide any suitable benefit or award to a player based on the player selecting one or more advertisements to display in association with the competition sequence.

In one embodiment, the gaming system enables a player to select one or more of a plurality of different advertisements to display in association with their competitor during the competition sequence. For example, if the player selects one or more designated advertisements to display in association with their competitor during a subsequent competition sequence within which their competitor is participating, the gaming system accumulates a quantity of remote user interface credits for that competitor. It should be appreciated that the gaming system may provide any suitable benefit or award to a player based on the player selecting one or more advertisements to display in association with their competitor during a subsequent competition sequence.

In one alternative embodiment, in addition to accumulating competitor points and eligibility points for competitors based on events which occur in association with a play of a game, the gaming system additionally determines whether to provide credits to a player in association with any provided competitor points or any provided eligibility points. In one embodiment, these provided credits have monetary value and can be redeemed by the player. In another embodiment, these provided credits do not have any initial monetary value and may only be wagered in association with a triggered competition sequence. In this embodiment, a player accumulates competition sequence credits and when a competition sequence is triggered, the player wagers these competition sequence credits in addition to any other wagers placed on the triggered competition sequence. In this embodiment, any awards provided to the player in association with the outcome of the triggered competition sequence are based, at least in part, on these wagered competition sequence credits.

In one alternative embodiment, in addition to accumulating eligibility points (and/or competitor points) for a competitor, the gaming system additionally causes the quantity of eligibility points (and/or competitor points) accumulated for a competitor to decay. In one embodiment, the gaming system causes the quantity of eligibility points (and/or competitor points) accumulated for a competitor to decay a designated amount based on one or more events which occur at a gaming device at a gaming establishment, such as a player cashing out or a player placing wagers below a designated wager threshold (e.g., a maximum wager amount or a designated quantity of wagers in a designated period of time). In one embodiment, the gaming system causes the quantity of eligibility points accumulated for a competitor to decay based on an outcome of a competition sequence. In another embodiment, the gaming system causes the quantity of eligibility points accumulated for a competitor to decay a designated amount based on one or more inputs made from a location remote from any gaming establishment (or made on a device which is not a gaming device upon which a wager can be placed) by a player that is associated with the competitor. In one such embodiment, the gaming system causes the quantity of eligibility points associated with a competitor to decay a designated amount if a player associated with the competitor makes an input to modify a parameter associated with the competitor, wherein the parameter is modified from a first condition to a second, different condition.

In one embodiment, the gaming system enables competitors that have been selected to participate in a triggered competition sequence to accumulate a quantity of competitor points during a pre-competition sequence point accumulation period. In one such embodiment, after the gaming system determines which competitors will participate in the triggered competition sequence, the gaming system initiates a pre-competition sequence point accumulation period. The gaming system then displays each participating competitor's relative probability of winning the triggered competition sequence, wherein each competitor's relative probability of winning the triggered competition sequence at the initiation of the pre-competition sequence period is determined based on the quantity of competitor points accumulated for the competitor.

In one embodiment, each participating competitor has a same relative probability of winning the triggered competition sequence at the initiation of the pre-competition sequence point accumulation period. For example, each competitor has zero points accumulated (and thus a probability of zero to win the triggered competition sequence) at the initiation of the pre-competition sequence point accumulation period, regardless of any points previously accumulated for the competitors. In another embodiment, each competitor's probability of winning the triggered competition sequence at the initiation of the pre-competition sequence point accumulation period is based on the quantity of competitor points previously accumulated for the competitor.

In one embodiment, the gaming system enables each competitor to accumulate competitor points until a conclusion of the pre-competition sequence point accumulation period. The gaming system then determines each participating competitors relative probability of winning the triggered competition sequence based on the quantity of competitor points accumulated for each competitor. In one embodiment, as competitors continue to accumulate competitor points, the relative probability of winning the triggered competition sequence changes for one or more of the participating competitor's. In this embodiment, the gaming system displays any changes to a competitor's relative probability of winning the triggered competition sequence. After the conclusion of the pre-competition sequence point accumulation period, the gaming system initiates the triggered competition sequence, wherein the gaming system determines an outcome for the triggered competition sequence for each competitor based, at least in part, on each competitor's relative probability of winning the triggered competition sequence. It should be appreciated that, by enabling competitors to accumulate competitor points during the pre-competition sequence point accumulation period, the gaming system provides that one or more competitors can increase their relative probability of winning the triggered competition sequence.

In one embodiment, the gaming system enables players to associate their competitor with a future competition sequence via the remote user interface, wherein each competitor associated with the future competition sequence has a same quantity of competitor points (and thus a same probability of winning the competition sequence) at an initiation of a pre-competition sequence point accumulation period. In one embodiment, when the player associates their competitor with the competition sequence, the gaming system specifies to the player a designated time for the initiation and conclusion of the pre-competition sequence point accumulation period, such as future dates and times. Accordingly, each player is provided an equal opportunity to accumulate competitor points for their competitor. In one embodiment, as discussed above, competitor points are accumulated in association with one or more events which occur in association with one or more plays of one or more primary games. Thus, while the gaming system enables players to associate a competitor with a competition sequence from the remote user interface (and thus from a gaming establishment or from a location which is remote from the gaming establishment), players accumulate competitor points for their competitor via one or more plays of one or more primary games on a gaming machine at a gaming establishment. In one embodiment, when a player associates their competitor with the competition sequence, the gaming system additionally specifies to the player a designated time for an initiation of the competition sequence, such as a future date and time. In one embodiment, the conclusion of the pre-competition sequence point accumulation period occurs prior to the initiation of the initiation of the competition sequence. In another embodiment, the conclusion of the pre-competition sequence point accumulation period occurs at the same time or at substantially the same time as the conclusion of the competition sequence. That is, in this embodiment, the gaming system enables competitors to continue to accumulate competitor points in association with the competition sequence.

In one alternative embodiment, the gaming system enables players to be assigned to or otherwise associated with a plurality of different competitors. In one embodiment, if a competitor point accumulation event or an eligibility point accumulation event occurs and a player is currently associated with at least one competitor, the gaming system enables the player to determine whether to be associated with another competitor. In one embodiment, if a player is associated with a plurality of different competitors, the gaming system accumulates competitor points and eligibility points for each competitor independent of each of the other competitors. In one such embodiment, after the player places a wager, the player selects one of the plurality of different competitors associated with the player and if a competitor point accumulation event or an eligibility point accumulation event occurs, the gaming system accumulates competitor points or eligibility points for the selected competitor. In another embodiment, if a competitor point accumulation event or an eligibility point accumulation event occurs, the gaming system accumulates competitor points or eligibility points for each of the plurality of competitors associated with the player.

In one embodiment, the gaming system allocates a portion of any competitor points or eligibility points to each of the plurality of competitors associated with a player. In this embodiment, if a first quantity of eligibility points (or competitor points) are associated with the eligibility point accumulation event (or competitor point accumulation event) that gaming system allocates a second, smaller quantity of eligibility points (or competitor points) to each of the competitors, wherein the second quantity of eligibility points (or competitor points) is determined based on the first quantity of eligibility points (or competitor points) and the quantity of competitors associated with the player. In another embodiment, if a first quantity of eligibility points (or competitor points) are associated with the eligibility point accumulation event (or competitor point accumulation event) that gaming system accumulates the first quantity of eligibility points (or competitor points) for each of the competitors associated with the player.

In one embodiment, if a competition sequence triggering event occurs, and a player is associated with a plurality of competitors, the gaming system enables the player to associate each eligible competitor associated with the player with the triggered competition sequence. Accordingly, by enabling a player to associate more than one competitor which is associated with the player in a competition sequence, the gaming system enables the player to increase the probability that a competitor that is associated with the player will win the competition sequence (and thus increase the probability that the player will win an award in association with the competition sequence).

In one alternative embodiment, the gaming system enables competitors that are not associated with any player to participate in a triggered competition sequence. In one such embodiment, each triggered competition sequence has a designated quantity of competitor positions (e.g., twenty positions). In this embodiment, if a plurality of the designated positions are not occupied by a competitor associated with a player (e.g., only fifteen of the twenty positions are occupied by competitors associated with players), the gaming system associates the plurality of non-occupied positions with competitors that are not associated with any player (e.g., a competitor associated with the gaming establishment). In this embodiment, the gaming system determines a quantity of competitor points for each of the competitors not associated with a player.

In one embodiment, the gaming system determines and displays each competitor's probability of winning the triggered competition sequence. The gaming system then enables a plurality of players to place wagers on any of the competitors participating in the triggered competition sequence, wherein the participating competitors include both competitors that are associated with players and competitors that are not associated with players. In this embodiment, if a player places a wager on a competitor that is not associated with a player and that competitor subsequently wins the triggered competition sequence, the gaming system provides an award to the player based, at least in part, on that player's wager and the probability of that competitor winning the triggered competition sequence. In one embodiment, the gaming system enables players to place a wager of any amount. In another embodiment, the gaming system enables players to place wagers between a designated minimum and a designated maximum amount.

In one embodiment, the gaming system does not provide a competition sequence award (such as a first place prize) to a player if a competitor that is not associated with a player wins (or otherwise achieves an outcome associated with an award) the triggered competition sequence. For example, as seen in FIG. 12, Competitor F is not associated with a player (as represented by the "N/A" displayed in the row of the Player column which is associated with Competitor F). In this example, the gaming system does not provide a competition sequence award if Competitor 6 wins the triggered competition sequence. In one embodiment, if a competitor that is not associated with a player wins a competition sequence, the gaming system retains the triggered competition sequence award that would otherwise be provided to the player associated with the competitor that wins the triggered competition sequence. In another embodiment, if a competitor that is not associated with a player wins a competition sequence, the gaming system allocates the triggered competition sequence award that would otherwise be provided to the player associated with the competitor that wins the triggered competition sequence to one or more subsequent competition sequences. For example, a gaming establishment hosts a premiere competition sequence each month, wherein the competition sequence award is funded via non-provided competition sequence awards.

In one embodiment, the gaming system enables any player playing any gaming device (e.g., a different type of gaming device) in the gaming establishment to place a wager on a triggered competition sequence. In this embodiment, if a competition sequence triggering event occurs, the gaming system displays an option to place a wager on the triggered competition sequence on a plurality of different gaming devices in the gaming establishment. In one embodiment, the option to place a wager on the triggered competition sequence is displayed to players playing gaming devices (including different types of gaming devices) via a service window of each of the gaming devices, as described in U.S. Published Patent Application No. 2007/0243934, U.S. Published Patent Application No. 2007/0243928, U.S. Published Patent Application No. 2008/0009344, U.S. Published Patent Application No. 2009/0104954, and/or U.S. Published Patent Application No. 2009/0233705. In various embodiments, the option to place a wager on the triggered competition sequence is displayed to players playing gaming devices (including different types of gaming devices) via any suitable display method.

In one alternative embodiment, the gaming system enables the player to increase the competitor's relative probability of winning a competition sequence after an initiation of the triggered competition sequence. In one embodiment, the gaming system enables the player associated with the competitor that is currently participating in a competition sequence to simultaneously or substantially simultaneously play the primary game. In this embodiment, the gaming system determines whether to increase the competitor's relative probability of winning the triggered competition sequence (which is in progress) based on one or more events which occur in association with one or more plays of the primary game, such as an increased wager amount from a first play to a second different play and a generation of a designated symbol combination.

In one alternative embodiment, a competition sequence is associated with a progressive award. In one embodiment, the gaming system triggers a competition sequence which is associated with the progressive award based on one or more suitable events which occur in association with a play of a primary game, such as a generation of a designated symbol combination or an amount of coin-in wagered on the gaming devices in the gaming system during a designated period of time reaching a designated threshold. In this embodiment, if a competition sequence which is associated with a progressive award is triggered, the gaming system determines a quantity of competitors to participate in the triggered competition sequence, wherein the competitor that wins the triggered competition sequence wins the progressive award. In another alternative embodiment, the gaming system associates a competition sequence with each of a plurality of separate progressive awards. In one embodiment, the gaming system randomly selects and provides one of the plurality of associated progressive awards to the player associated with the competitor that wins the competition sequence. In another embodiment, the gaming system presents a secondary game to the player associated with the competitor that wins the competition sequence, wherein the gaming system determines which of the plurality of progressive awards to provide to the player based, at least in part, on an outcome of the secondary game.

In addition to providing a progressive award to a player that is associated with a competitor participating in a triggered competition sequence, the gaming system additionally enables players that are not associated with a competitor participating in the triggered competition sequence to win a progressive award. In one such embodiment, the gaming system enables a player to win a progressive award based on one or more wagers placed on a triggered competition sequence. For example, if the triggered competition sequence is associated with a horse race, the gaming system enables a player wagering on the horse race to win a progressive award if that player places a bet on the finishing order of the horses in the race (such as a Quinella, an Exacta, a Trifecta and a Superfecta).

In one alternative embodiment, the gaming system associates a competitor with one of a plurality of different grades. In this embodiment, the gaming system determines a competitor's eligibility to participate in a triggered competition sequence based on the competitor's grade. In one embodiment, the gaming system determines the competitor's grade based on a quantity of eligibility points which have been accumulated for the competitor. For example, a competitor having a first quantity of accumulated eligibility points is associated with a first grade, and a competitor having a second, larger quantity of accumulated eligibility points is associated with a second, higher grade.

In another embodiment, the gaming system determines a competitor's grade based on the outcomes of one or more competition sequences in which the competitor has participated. For example, if a competitor is associated with a first grade, and the competitor subsequently wins a competition sequence, the gaming system associates the competitor with a second, higher grade. That is, in this example, the gaming increased the competitor's grade because the competitor won the competition sequence.

In one alternative embodiment, for one or more triggered competition sequences, the gaming system guarantees that a competitor associated with a player wins the triggered competition sequence (and thus guarantees that a player is provided a competition sequence award). In one such embodiment, the gaming system maintains one or more competition sequences which are triggered at designated points in time, such as daily, weekly, monthly and/or yearly. In this embodiment, when one of the maintained competition sequences is triggered, the gaming system selects a designated quantity of competitors to participate in the triggered competition sequence, wherein each competitor selected to participate in the triggered competition sequence is associated with a player. In one embodiment, the gaming system selects the designated quantity of competitors based on a designated criteria, such as a quantity of eligibility points or a quantity of competitor points. For example, once a year, the gaming system selects the competitors having the 20 highest accumulated quantities of eligibility points to participate in a competition sequence associated with awards totaling $1,000,000. It should be appreciated that, in this example, $1,000,000 in awards are paid out the players participating in the competition sequence.

In one embodiment, the outcome of each competition sequence is determined based on each competitor's accumulated quantity of competitor points (and thus each competitor's relative probability of winning the triggered competition sequence) and based on one or more random determinations. In one such embodiment, the gaming system determines an outcome of the triggered competition sequence for each competitor based on a determination of whether any numbers allotted to the competitor match a randomly selected number. In this embodiment, upon or prior to an initiation of a competition sequence, the gaming system selects a random number from a range of numbers, wherein the range of numbers is based on the total quantity of competitor points accumulated for all of the competitors participating in the triggered competition sequence. The gaming system then allocates a first quantity of numbers in the range of numbers to a first one of the participating competitors, wherein the quantity of numbers allocated to the first one of the participating competitors is determined based on the quantity of competitor points accumulated for the competitor. Similarly, the gaming system additionally allocates a quantity of different numbers in the range of numbers to each of the additional competitors participating in the triggered competition sequence, wherein the quantity of different numbers allocated to each of the additional competitors participating in the triggered competition sequence is determined based on each of the participating competitor's quantity of accumulated competitor points, as discussed above. It should be appreciated that no two competitors are allocated a same number from the range of numbers. After allocating the numbers from the range to each of the participating competitors, the gaming system compares the randomly selected number with the numbers allocated to each of the competitors and if a match occurs, the competitor associated with the matching number wins the triggered competition sequence.

It should be appreciated that, in different embodiments, a plurality of outcomes may be determined for a single competition sequence. For example, a triggered competition sequence is presented in the form of a race, wherein participating competitors compete for each of a plurality of finishing positions. In this example, for each of the plurality of finishing positions in the race, the gaming system selects a random number from a range of numbers and associates the selected number with the finishing position, wherein no two finishing positions are associated with a same number. The gaming system additionally assigns one or more numbers from a range of numbers to each of the plurality of participating competitors, based on each competitor's relative probability of winning the race, as discussed above. The gaming system then compares, for each of the plurality of finishing positions in the race, the number selected for that finishing position with the range of numbers allocated to each of the competitors participating in the triggered competition sequence. If a match occurs, the competitor associated with the matching number finishes the race in that position.

In one alternative embodiment, the triggered competition sequence disclosed herein can be implemented in accordance with a tournament gaming system, wherein players participating in the tournament compete for a tournament award which is provided based on the tournament scores formed for each of the participating players during the tournament sequence. In one embodiment, each participating player is associated with a competitor. In this embodiment, the gaming system accumulates tournament competitor points for a competitor associated with a player for any competitor point accumulation events which occur in association with a tournament sequence. In another embodiment, the gaming system additionally or alternatively accumulates tournament eligibility points for the competitor associated with the player for any eligibility point accumulation events which occur in association with the tournament sequence. The gaming system additionally accumulates tournament points for each participating player to form a tournament score for the player, wherein the tournament points are accumulated based on one or more events with occur in association with the tournament, such as generated outcomes. In one embodiment, if a competition sequence triggering event occurs in association with the tournament sequence, the gaming system determines a quantity of competitors to participate in the competition sequence, the participating competitors being associated with players that are participating in the tournament. In one embodiment, the gaming system determines which competitors will participate in the competition sequence based on the quantity of tournament eligibility points accumulated for each competitor. In another embodiment, the gaming system determines which competitors will participate in the competition sequence based on the quantity of tournament competitor points accumulated for each competitor. The gaming system determines, for each participating competitor, a relative probability of winning the competition sequence based on the quantity of tournament competitor points which have been accumulated for that competitor. The gaming system also determines an outcome of the competition sequence based on each competitor's relative probability of winning the competition sequence and provides a quantity of tournament points to the players associated with participating competitors based on the determined outcome. In one embodiment, for each player associated with a participating competitor, the provided tournament points for that competitor are added to or otherwise utilized to modify the player's tournament score. The gaming system then determines, for each player participating in the tournament, whether to provide an award based on the tournament score formed for the player.

In one alternative embodiment, the gaming system designates a minimum relative probability of winning a competition sequence. In one such embodiment, if an otherwise eligible competitor's relative probability of winning the triggered competition sequence (which is determined based on the competitor's accumulated quantity of competitor points) is lower than this minimum relative probability, the gaming system prevents or otherwise prohibits the competitor from participating in the triggered competition sequence. In another such embodiment, if an otherwise eligible competitor's relative probability of winning the triggered competition sequence is lower than this minimum probability, the gaming system enables the player associated with the competitor to input a designated monetary amount in exchange for entry into the competition sequence. For example, if the minimum probability of winning a competition sequence is 5% and a competitor currently has a 1% probability of winning the competition sequence, the gaming system enables the player to input a designated monetary amount in exchange for entry into the competition sequence. In one embodiment, the monetary amount is a predetermined amount. In this embodiment, regardless of a margin by which the minimum relative probability of winning a competition sequence exceeds the competitor's relative probability of winning the competition sequence, a player associated with the competitor need only input the designed monetary amount in exchange for entry into the competition sequence. In another embodiment, the gaming system determines the monetary amount to be provided in exchange for entry into the competition sequence based on the margin by which the required minimum relative probability of winning the competition sequence exceeds the competitor's relative probability of winning the competition sequence. Thus, in certain embodiments, the gaming system enables a player that is associated with an otherwise eligible competitor to buy into a competition sequence. In one embodiment, the option to buy into a competition sequence is only available to players that are associated with otherwise eligible competitors who have a relative probability of winning the triggered competition sequence which is lower than a minimum relative probability. In another embodiment, any player that is associated with any eligible competitor, regardless of the competitor's relative probability of winning the competition sequence, may provide a monetary input in exchange for an increase in the probability that the competitor associated with that player will win the competition sequence.

In another alternative embodiment, the gaming system designates a maximum relative probability (i.e., a maximum relative quantity of competitor points accumulated for a competitor) of winning a competition sequence. In one such embodiment, if a competitor's relative probability of winning the triggered competition sequence (which is determined based on the competitor's accumulated quantity of competitor points) exceeds this maximum relative probability, the gaming system prevents or otherwise prohibits the competitor from participating in the triggered competition sequence. In another such embodiment, if a competitor's relative probability of winning the triggered competition sequence exceeds this maximum probability (i.e., the relative quantity of competitor points accumulated for a competitor exceeds the total quantity of competitor points for each of the participating competitors by a threshold amount), the gaming system enables the player to modify the competitor's relative probability of winning the triggered competition sequence to reflect the maximum or an otherwise alternate relative probability. In one such embodiment, the gaming system determines the maximum relative quantity of competitor points that may be utilized by a competitor for a competition sequence. In one embodiment, this maximum relative quantity of competitor points is determined based on the maximum relative probability of winning the competition sequence. For example, if the maximum relative probability of winning a competition sequence a competitor may obtain is 50%, and that 50% probability of winning the competition sequence translates into a maximum relative quantity of competitor points of 150 competitor points, and an otherwise eligible competitor has 195 competitor points, the gaming system enables the competitor to utilize only 150 of the 195 competitor points for that competition sequence. In one embodiment, any competitor points in excess of this maximum relative quantity of competitor points are retained by the competitor for a subsequent competition sequence. Thus, in the example above, the competitor retains 45 competitor points to utilize in a subsequent competition sequence. In another embodiment, one or more of any competitor points not utilized for a competition sequence within which a competitor participates are discarded (i.e., these competitor points not utilized by the competitor for the competition sequence are not retained by the competitor to utilize in a subsequent competition sequence).

It should be appreciated that, in certain alternative embodiments, the gaming system may define different maximum relative probabilities of winning a competition sequence for competitors that are associated with players having different player status levels. For example, for a same competition sequence, a maximum relative probability of winning the competition sequence that is defined for a competitor associated with a player having a first player status level is different than a maximum relative probability of winning the competition sequence that is defined for a competitor associated with a player having a second, different player status level.

While the embodiments discussed above include certain instances wherein a competitor is associated with a virtual, gaming system controlled player, it should be appreciated that in certain instances, the number of players eligible to participate in a triggered competition sequence reaches or exceeds the number of players required to participate in the triggered competition sequence. In these instances, rather than utilize competitors, the gaming system accumulates eligibility points and/or competitor points for each player (or a gaming device upon which the player is currently wagering). Accordingly, in these instances, a player's eligibility to participate in the triggered competition sequence is determined based on the quantity of eligibility points accumulated for the player. Additionally, the player's relative probability of winning the triggered competition sequence is determined based on the quantity of competitor points accumulated for the player relative to the quantity of competitor points accumulated for each of the other players participating in the triggered competition sequence. In one embodiment, if the number of players eligible to participate in a triggered competition sequence reaches or exceeds the number of players required to participate in the triggered competition sequence, the gaming system enables players to determine whether to participate in the competition sequence. That is, the gaming system provides players the opportunity to defer entry into a competition sequence.

In one alternative embodiment, rather than employ a dual point structure (such as eligibility points and competitor points) the gaming system determines a player's eligibility and probability to win a competition sequence based on the quantity of competitor points accumulated for that player. That is, in this embodiment, the gaming system does not maintain or accumulate a separate point structure in addition to competitor points (such as separate eligibility points).

While the embodiments discussed above include a primary game played on one or more gaming devices in a gaming system, in one alternative embodiment, the primary game is implemented in accordance with one or more games played on one or more gaming tables, as disclosed herein. In this embodiment, the gaming system provides competitor points and/or eligibility points based on one or more events with occur in association with one or more plays of one or more games on one or more gaming tables.

In one embodiment, a competitor point accumulation event occurs and/or an eligibility point accumulation event occurs and/or a competition sequence triggering event occurs based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes the competitor point accumulation event to occur and/or the eligibility point accumulation event to occur and/or the triggered competition sequence triggering event to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment of the gaming system disclosed herein, a competitor point accumulation event occurs and/or an eligibility point accumulation event occurs and/or a competition sequence triggering event occurs based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes the competitor point accumulation event to occur and/or the eligibility point accumulation event to occur and/or the triggered competition sequence triggering event to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another embodiment of the gaming system disclosed herein, a competitor point accumulation event occurs and/or an eligibility point accumulation event occurs and/or a competition sequence triggering event occurs based on a predefined variable reaching a defined parameter threshold. For example, when the 500,000$^{th}$ player has played a gaming device of the gaming system (ascertained from a player tracking system), the competitor point accumulation event occurs and/or the eligibility point accumulation event occurs and/or the triggered competition sequence triggering event occurs. In different embodiments, the predefined parameter thresholds include a length of time, a length of time after a certain dollar amount is hit, a wager level threshold for a specific machine (which gaming device is the first to contribute $250,000), a number of gaming devices active, or any other parameter that defines a suitable threshold.

In another embodiment of the gaming system disclosed herein, a competitor point accumulation event occurs and/or an eligibility point accumulation event occurs and/or a competition sequence triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the central controller/gaming device processor recognizes the player's identification (via the player tracking system) when the player inserts or otherwise associates their player tracking card in the gaming device. The central server/gaming device processor determines the player tracking level of the player and if the current player tracking level defined by the gaming system operator is eligible for the competitor point accumulation event and/or the eligibility point accumulation event and/or the triggered competition sequence triggering event. In one embodiment, the gaming system operator defines minimum bet levels required for the competitor point accumulation event to occur and/or the eligibility point accumulation event to occur and/or the triggered competition sequence triggering event to occur based on the player's card level.

In another embodiment of the gaming system disclosed herein, a competitor point accumulation event occurs and/or an eligibility point accumulation event occurs and/or a competition sequence triggering event occurs based on a system determination, including one or more random selections by the central controller. In one embodiment, as discussed above, the central controller tracks all active gaming devices and the wagers they placed. Each gaming device has its own entry defining its state as either active or inactive and also defining the values of the wagers from that gaming device. In one embodiment, active status means that the gaming device is being actively played by a player and enrolled/inactive status means that the gaming device is not being actively played by a player. The active status requirements can be based on any suitable number of satisfied criteria or defined in any suitable manner by the implementer of the gaming system. In one such embodiment, based on the gaming device's state as well as one or more wager pools associated with the gaming device, the central controller determines whether the competitor point accumulation event to occur and/or the eligibility point accumulation event to occur and/or the triggered competition sequence triggering event to occur. In one such embodiment, the player who consistently places a higher wager is more likely to be associated with an occurrence of the competitor point accumulation event and/or the eligibility point accumulation event and/or the triggered competition sequence triggering event than a player who consistently places a minimum wager. It should be appreciated that the criteria for determining whether a player is in active status or inactive status for determining if the competitor point accumulation event will occur and/or the eligibility point accumulation event will occur and/or the triggered competition sequence triggering event will occur may be the same as, substantially the same as, or different than the criteria for determining whether a player is in active status or inactive status for another competitor point accumulation event to occur and/or eligibility point accumulation event to occur and/or competition sequence triggering event to occur.

In another embodiment of the gaming system disclosed herein, a competitor point accumulation event occurs and/or an eligibility point accumulation event occurs and/or a competition sequence triggering event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, the competitor point accumulation event will occur and/or the eligibility point accumulation event will occur and/or the triggered competition sequence triggering event will occur. It should be appreciated that any suitable manner of causing the bonus sequence triggering event to be provided may be implemented in accordance with the gaming system and method disclosed herein.

In another embodiment, a competitor point accumulation event occurs and/or an eligibility point accumulation event occurs and/or a competition sequence triggering event occurs independent of any displayed event in any play of any game of any of the gaming devices in the gaming system. That is, the competitor point accumulation event and/or the eligibility point accumulation event and/or the triggered competition sequence triggering event is based on a trigger that is unknown to the player (i.e., a mystery trigger). In another embodiment, the gaming system tracks the occurrences of one or more suitable events occurring at or in association with one or more players and/or one or more gaming devices in the gaming system and determines, based on these tracked events, whether a competitor point accumulation event will occur and/or the eligibility point accumulation event occur and/or the triggered competition sequence triggering event will occur. In another embodiment, the gaming system defines one or more game play parameters, wherein each time a player's tracked game play activity satisfies the defined parameter, the competitor point accumulation event occurs and/or the eligibility point accumulation event occurs and/or the triggered competition sequence triggering event occurs.

In various embodiments, one or more of:

(a) the competitor the gaming system determines to associate with the player;

(b) the competitors (and thus the players) the gaming system selects to participate in the triggered competition sequence;

(c) the quantity of competitor points the gaming system accumulates for the competitor for each competitor point accumulation event;

(d) the quantity of eligibility points the gaming system accumulates for the competitor for each eligibility point accumulation event;

(e) the quantity of competition sequence credits the gaming system accumulates for the player;

(f) the quantity of competitor points determined for each competitor not associated with a player (and thus the competitor's relative probability of winning the triggered competition sequence); and/or (g) any other determination made by the gaming system disclosed herein are predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

Information Provided to Player

As indicated above, suitable information about the point accumulation event and the current high score can be provided to the players through one or more displays on the gaming devices or additional information displays positioned near the gaming devices, such as above a bank of system gaming devices. In one embodiment, a metering and/or information display device may be used to display information regarding the point accumulation events and the current high score. Examples of such information are:

(1) that a competitor point accumulation event and/or an eligibility point accumulation event has occurred;

(2) that a competitor point accumulation event and/or an eligibility point accumulation event will shortly occur, (3) that competition sequence triggering event has occurred;

(4) an average amount of time between each competitor point accumulation event and/or each eligibility point accumulation event occurring;

(5) an average amount of time between competition sequences;

(6) an award provided in association with competitor point accumulation event and/or an eligibility point accumulation event;

(7) an award provided in association with a competitor winning a triggered competition sequence;

(8) which players have won awards in association with triggered competition sequence;

(9) the amount of the awards won in association with a competition sequence;

(10) the highest award won in association with a competition sequence;

(11) the average award won in association with a competition sequence;

It should be appreciated that such information can be provided to the players through any suitable audio, audio-visual or visual devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a processor, and a memory device which stores a plurality of instructions, which when executed by the processor, cause the processor to:

responsive to an input made, via a remote user interface of a device separate from a gaming device of a gaming establishment, by an identified user, accumulate a quantity of non-monetary units in association with the identified user, wherein the accumulated quantity of non-monetary units are usable for a benefit at the gaming establishment, and cause a display, by a display device, of the accumulated quantity of non-monetary units associated with the identified user.

2. The gaming system of claim 1, wherein the quantity of non-monetary units is selected from the group consisting of: a quantity of eligibility points associated with a competition sequence, and a quantity of remote user interface tokens.

3. The gaming system of claim 1, wherein the input made, via the remote user interface, by the identified user is selected from the group consisting of: an input to play a game, and an input to modify a parameter of a character associated with the identified user.

4. The gaming system of claim 1, wherein the benefit is selected from the group consisting of: an eligibility to participate in a competition sequence associated with a monetary award, a modified probability of winning a monetary award in association with a play of a game, a quantity of player tracking points and a quantity of loyalty points.

5. The gaming system of claim 4, wherein the play of the game comprises a competition sequence.

6. The gaming system of claim 1, wherein a first input made, via the remote user interface, by the identified user is associated with a first quantity of non-monetary units accumulated in association with the identified user and a second, different input made, via the remote user interface, by the identified user is associated with a second, different quantity of non-monetary units accumulated in association with the identified user.

7. The gaming system of claim 1, wherein the processor is configured to communicate with the gaming device of the gaming establishment.

8. The gaming system of claim 1, wherein the benefit is received at the gaming device of the gaming establishment and any award determined for any play of any game displayed by a display device of the gaming device causes an increase of a gaming device credit balance, said gaming device credit balance being increasable via a gaming device acceptor of a physical item associated with a monetary value, and said gaming device credit balance being decreasable via a gaming device cashout device.

9. A gaming system comprising:

a display device, an input device, a processor, and a memory device which stores a plurality of instructions, which when executed by the processor, cause the processor to:

responsive to a wager being placed, via the input device, on a play of a wagering game:

determine a wagering game outcome, cause the display device to display the determined wagering game outcome, determine a wagering game award associated with the determined wagering game outcome, and cause the display device to display the determined wagering game award associated with the determined wagering game outcome, and cause a benefit to be provided in exchange for a quantity of non-monetary units redeemed by an identified player, wherein the quantity of non-monetary units are accumulated responsive to an input made, via a remote user interface of a device separate from the gaming system, by the identified player.

10. The gaming system of claim 9, wherein the quantity of non-monetary units is selected from the group consisting of: a quantity of eligibility points associated with a competition sequence, and a quantity of remote user interface tokens.

11. The gaming system of claim 9, wherein the input made, via the remote user interface, by the identified player is selected from the group consisting of: an input to play a game, and an input to modify a parameter of a character associated with the identified player.

12. The gaming system of claim 9, wherein the benefit is selected from the group consisting of: an eligibility to participate in a competition sequence associated with a monetary award, a modified probability of winning a monetary award in association with a play of a game, a quantity of player tracking points and a quantity of loyalty points.

13. The gaming system of claim 9, wherein a first input made, via the remote user interface, by the identified player is associated with a first quantity of non-monetary units accumulated in association with the identified player and a second, different input made, via the remote user interface, by the identified player is associated with a second, different quantity of non-monetary units accumulated in association with the identified player.

14. The gaming system of claim 9, which comprises an acceptor, and a cashout device, wherein when executed by the processor, the plurality of instructions cause the processor to, responsive to a physical item being received via the acceptor, establish a credit balance based, at least in part, on a monetary value associated with the received physical item, and responsive to a cashout input being received via the cashout device, cause an initiation of any payout associated with the credit balance.

15. A method of operating a gaming system, said method comprising:

responsive to an input made, via a remote user interface of a device separate from a gaming device of a gaming establishment, by an identified user, causing a processor to accumulate a quantity of non-monetary units in association with the identified user, wherein the accumulated quantity of non-monetary units are usable for a benefit at the gaming establishment, and causing a display, by a display device, of the accumulated quantity of non-monetary units associated with the identified user.

16. The method of claim 15, wherein the quantity of non-monetary units is selected from the group consisting of: a quantity of eligibility points associated with a competition sequence, and a quantity of remote user interface tokens.

17. The method of claim 15, wherein the input made, via the remote user interface, by the identified user is selected from the group consisting of: an input to play a game, and an input to modify a parameter of a character associated with the identified user.

18. The method of claim 15, wherein the benefit is selected from the group consisting of: an eligibility to participate in a competition sequence associated with a monetary award, a modified probability of winning a monetary award in association with a play of a game, a quantity of player tracking points and a quantity of loyalty points.

19. The method of claim 18, wherein the play of the game comprises a competition sequence.

20. The method of claim 15, wherein a first input made, via the remote user interface, by the identified user is associated with a first quantity of non-monetary units accumulated in association with the identified user and a second, different input made, via the remote user interface, by the identified user is associated with a second, different quantity of non-monetary units accumulated in association with the identified user.

21. The method of claim 15, wherein the benefit is received at the gaming device of the gaming establishment and any award determined for any play of any game displayed by a display device of the gaming device causes an increase of a gaming device credit balance, said gaming device credit balance being increasable via a gaming device acceptor of a physical item associated with a monetary value, and said gaming device credit balance being decreasable via a gaming device cashout device.

* * * * *